United States Patent
Ota et al.

(10) Patent No.: US 10,797,737 B2
(45) Date of Patent: Oct. 6, 2020

(54) DISTORTION COMPENSATION DEVICE AND DISTORTION COMPENSATION METHOD

(71) Applicant: FUJITSU LIMITED, Kawasaki-shi, Kanagawa (JP)

(72) Inventors: Tomoya Ota, Kawasaki (JP); Toshio Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/285,009

(22) Filed: Feb. 25, 2019

(65) Prior Publication Data

US 2019/0356345 A1 Nov. 21, 2019

(30) Foreign Application Priority Data

May 17, 2018 (JP) .................................. 2018-095718

(51) Int. Cl.
*H04B 1/04* (2006.01)

(52) U.S. Cl.
CPC ... *H04B 1/0475* (2013.01); *H04B 2001/0425* (2013.01)

(58) Field of Classification Search
CPC ....................... H04B 1/0475; H04B 2001/0425
See application file for complete search history.

(56) References Cited

U.S. PATENT DOCUMENTS

| 8,391,809 B1 * | 3/2013 | Fuller | .................. | H04B 1/0475 |
| | | | | 455/114.3 |
| 2012/0098596 A1 | 4/2012 | Nagatani et al. | | |

(Continued)

FOREIGN PATENT DOCUMENTS

| JP | 2009-213113 A | 9/2009 |
| JP | 2010-045507 A | 2/2010 |

(Continued)

OTHER PUBLICATIONS

Ma, Yuelin, et al., "Spectra-Folding Feedback Architecture for Concurrent Dual-Band Power Amplifier Predistortion," IEEE Transactions on Microwave Theory and Techniques, vol. 63, No. 10, (pp. 3164-3174), Oct. 2015.

(Continued)

*Primary Examiner* — Kabir A Timory
(74) *Attorney, Agent, or Firm* — Arent Fox LLP

(57) ABSTRACT

A distortion compensation device includes a generating unit, a calculation unit, a conversion unit, and a distortion compensation unit. The generating unit generates, from an output signal of a power amplifying unit that amplifies transmission signals having a plurality of different bands, a superimposed signal in which the transmission signals having the different bands have been superimposed. The calculation unit calculates, based on the superimposed signal, a coefficient indicating a forward characteristic of nonlinear distortion of the power amplifying unit associated with each of the transmission signals having the different bands. The conversion unit converts the coefficient calculated by the first calculation unit to a coefficient indicating an inverse characteristic of the nonlinear distortion of the power amplifying unit. The distortion compensation unit performs, by using the coefficients converted by the first conversion unit, a predistortion process on each of the transmission signals having different bands.

6 Claims, 12 Drawing Sheets

(56) References Cited

U.S. PATENT DOCUMENTS

2012/0119810 A1    5/2012  Bai
2013/0120062 A1    5/2013  Lozhkin
2014/0064406 A1*   3/2014  Onishi .................. H04L 27/361
                                                           375/297

FOREIGN PATENT DOCUMENTS

| JP | 2012-90158 A | 5/2012 |
| JP | 2013-106330 A | 5/2013 |
| JP | 2013-542696 A | 11/2013 |
| WO | WO-2013/118367 A1 | 8/2013 |

OTHER PUBLICATIONS

Liu, Youjiang, et al., "Concurrent Dual-Band Digital Predistortion With a Single Feedback Loop," IEEE Transactions on Microwave Theory and Techniques, vol. 63, No. 5, (pp. 1556-1568), May 2015.

\* cited by examiner

DISTORTION COMPENSATION DEVICE AND DISTORTION COMPENSATION METHOD

CROSS-REFERENCE TO RELATED APPLICATION

This application is based upon and claims the benefit of priority of the prior Japanese Patent Application No. 2018-095718, filed on May 17, 2018, the entire contents of which are incorporated herein by reference.

FIELD

The embodiments discussed herein are related to a distortion compensation device and a distortion compensation method.

BACKGROUND

A radio transmission device is provided with a power amplifier that amplifies power of transmission signals. In the radio transmission device, in general, in order to increase power efficiency of the power amplifier, the power amplifier is operated in the vicinity of the saturation region of the power amplifier. However, if the power amplifier is operated in the vicinity of the saturation region, nonlinear distortion of the power amplifier is increased. If the nonlinear distortion is increased, the quality of signals, such as an adjacent channel leakage power ratio is degraded. Thus, to reduce the nonlinear distortion, in the radio transmission device, a distortion compensation device that compensates the nonlinear distortion is provided.

There is a "digital predistortion technique" as one of distortion compensation techniques used in the distortion compensation device. In the distortion compensation device that uses the digital predistortion technique, a distortion compensation coefficient having an inverse characteristic of the nonlinear distortion of the power amplifier is multiplied by a transmission signal and, then, the transmission signal obtained by multiplying the distortion compensation coefficient is input to the power amplifier and is amplified by the power amplifier. Consequently, the nonlinear distortion in the transmission signal output from the power amplifier is reduced.

Furthermore, in a case where transmission signals are amplified by the power amplifier for each transmission signal having a different band or in a case where wide band signals including transmission signals having a plurality of bands are amplified by a single power amplifier, a sampling rate in digital signal processing becomes high because a plurality of signals having widely different bands are amplified. In this way, it is difficult to compensate nonlinear distortion of the plurality of bands by a single distortion compensation device. Thus, it is conceivable to compensate the nonlinear distortion for each transmission signal having a different band. However, if the distortion compensation device is provided for each transmission signal having a different band, resulting in an increase in the size of a circuit of the distortion compensation device and an increase in power consumption.

In contrast, studies have been conducted on a technology that feeds back an output signal, which has been output from the power amplifier and includes the transmission signals having a plurality of different bands, by superimposing the output signal on a single baseband signal and that compensates nonlinear distortion of the power amplifier in each of the bands by using the fed back and superimposed signal. Consequently, it is possible to cut down a down converter that is used to feed back an output of the power amplifier as a baseband signal, an analog to digital converter (ADC) that is used to convert a feedback signal from an analog signal to a digital signal, and the like.

Conventional techniques are described in Japanese Laid-open Patent Publication No. 2009-213113, Japanese Laid-open Patent Publication No. 2012-90158, Yuelin Ma, Yasushi Yamao, "Spectra-Folding Feedback Architecture for Concurrent Dual-Band Power Amplifier Predistortion," IEEE Transactions on Microwave Theory and Techniques, vol. 63, no. 10, pp. 3164-3174, October 2015, and Youjiang Liu, Jonmei J. Yan, Peter M. Asbeck, "Concurrent Dual-Band Digital Predistortion With a Single Feedback Loop," IEEE Transactions on Microwave Theory and Techniques, vol. 63, no. 5, pp. 1556-1568, May 2015.

However, there is the following problem in a conventional technique that feeds back an output signal of the power amplifier in a plurality of bands by superimposing the output signal on a single baseband signal and that compensates nonlinear distortion of the power amplifier in each of the bands by using the fed back and superimposed signals. In the conventional technique, a process of obtaining a forward characteristic of the power amplifier representing a model with multiple inputs and one output and a process of obtaining an inverse characteristic of the power amplifier representing a model with one input and one output of each of the bands are performed. These processes are performed by using, for example, the least mean square (LMS) algorithm or the like. Namely, in the conventional technique, similar processes of updating a coefficient using the LMS algorithm or the like are performed twice.

Furthermore, in the conventional technique, a process of multiplying a model coefficient in a model of the power amplifier in each of the bands and a process of multiplying a distortion compensation coefficient in each of the bands in a distortion compensation unit are performed. Namely, similar processes of multiplying the coefficients are performed twice. Consequently, in the conventional technique, a redundant process is performed and thus there is a room for improvement in terms of reducing the size of a circuit and cutting back power consumption.

SUMMARY

According to an aspect of an embodiment, a distortion compensation device includes a generating unit, a first calculation unit, a first conversion unit, and a distortion compensation unit. The generating unit generates, from an output signal of a power amplifying unit that amplifies transmission signals having a plurality of different bands, a superimposed signal in which the transmission signals having the plurality of different bands have been superimposed. The first calculation unit calculates, based on the superimposed signal, a coefficient indicating a forward characteristic of nonlinear distortion of the power amplifying unit associated with each of the transmission signals having the different bands. The first conversion unit converts the coefficient calculated by the first calculation unit to a coefficient indicating an inverse characteristic of the nonlinear distortion of the power amplifying unit. The distortion compensation unit performs, by using the coefficients converted by the first conversion unit, a predistortion process on each of the transmission signals having the different bands.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Furthermore, the embodiments described below do not limit the disclosed technology. Furthermore, the embodiments can be used in any appropriate combination as long as the processes do not conflict with each other.

[a] First Embodiment

Method for Updating a Distortion Compensation Coefficient

Figure 1:
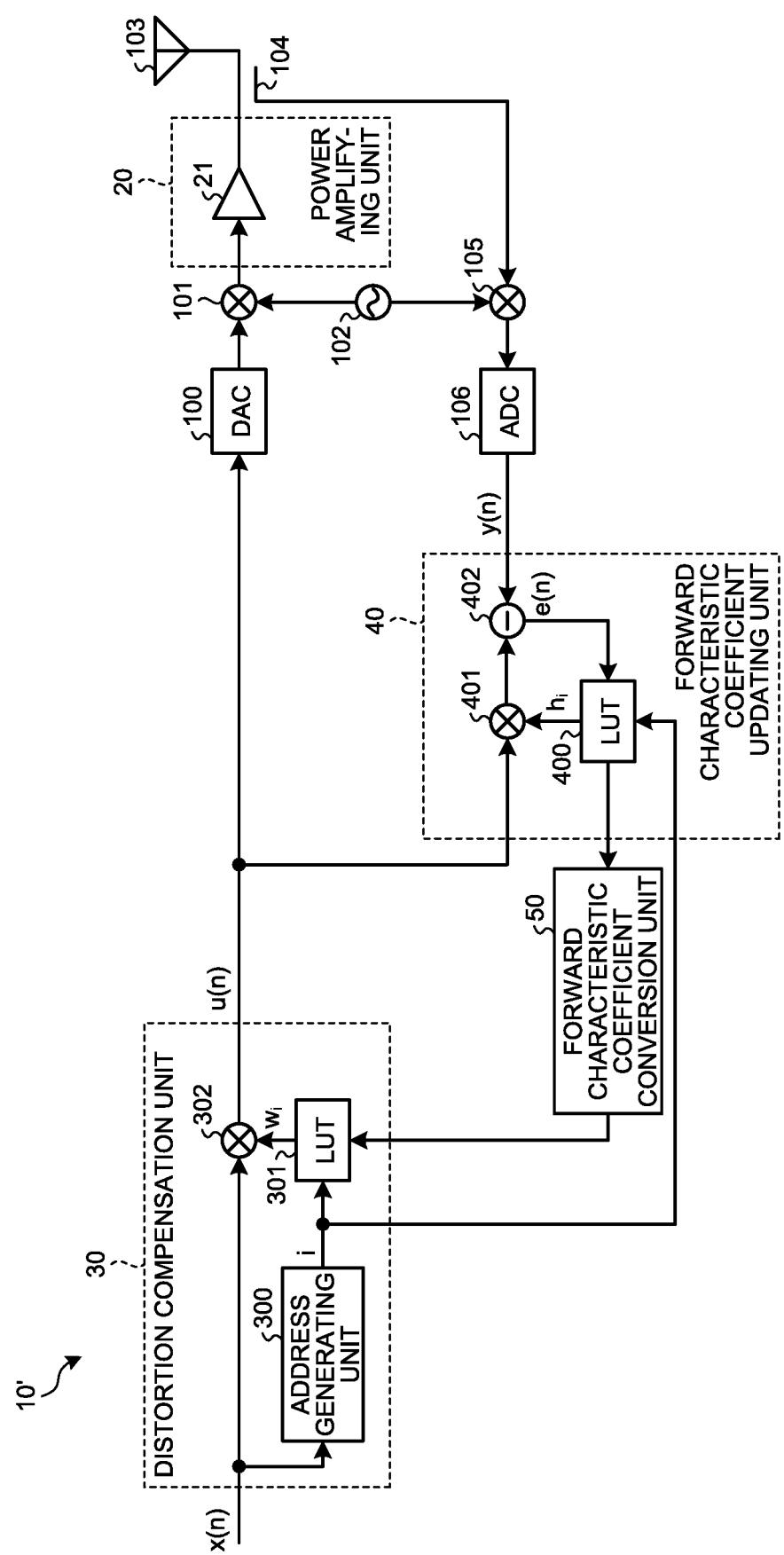
FIG. 1 is a diagram illustrating an example of a method for updating a distortion compensation coefficient according to a first embodiment.

First, the outline of a method for updating a distortion compensation coefficient according to the embodiment will be described. FIG. 1 is a diagram illustrating an example of a method for updating a distortion compensation coefficient according to a first embodiment. In FIG. 1, to simplify a description, a description will be given by focusing on a transmission signal x(n) that is transmitted in a single band.

A distortion compensation device 10' includes a digital-to-analog converter (DAC) 100, an up converter 101, an oscillator 102, an antenna 103, a coupler 104, a down converter 105, and an ADC 106. Furthermore, the distortion compensation device 10' includes a distortion compensation unit 30, a forward characteristic coefficient updating unit 40, and a forward characteristic coefficient conversion unit 50.

The distortion compensation unit 30 generates a predistortion signal u(n) that compensates nonlinear distortion of a power amplifying unit 20 by applying, to the transmission signal x(n) output from a baseband (BB) processing unit (not illustrated), an inverse characteristic with respect to a forward characteristic of the nonlinear distortion of the power amplifying unit 20. A process of generating the predistortion signal u(n) from the transmission signal x(n) is an example of a predistortion process.

The distortion compensation unit 30 includes an address generating unit 300, a look-up table (LUT) 301, and a multiplier 302. The address generating unit 300 generates an address i that is associated with the magnitude of the transmission signal x(n) output from the BB processing unit. In the embodiment, the address generating unit 300 generates the magnitude of the power of the transmission signal x(n) as the address i. Furthermore, the address generating unit 300 may also generate the magnitude of the amplitude of the transmission signal x(n) as the address i. Furthermore, the value of the address i may also be the value obtained by converting the magnitude of the power or the amplitude of the transmission signal x(n) to a decibel.

The LUT 301 stores therein, in association with the address i, a distortion compensation coefficient $w_i$. When the number of the addresses i is denoted by K and a power threshold at the time of calculation of the address i is denoted by $\alpha_i$, $\alpha_i \leq |x(n)|^2 < \alpha_{i+1}$ and $0 \leq i < K$ are satisfied. The LUT 301 outputs the distortion compensation coefficient $w_i$ associated with the address i generated by the address generating unit 300 to the multiplier 302. Furthermore, the LUT 301 updates the distortion compensation coefficient $w_i$ stored in the LUT 301 by using the coefficient that has been output from the forward characteristic coefficient conversion unit 50.

The multiplier 302 generates the predistortion signal u(n) by multiplying the transmission signal x(n) output from the BB processing unit by the distortion compensation coefficient $w_i$ output from the LUT 301.

The predistortion signal u(n) output from the multiplier 302 is converted from a digital signal to an analog signal by the DAC 100. The up converter 101 performs a process, such as a modulation process or an up conversion process, on the predistortion signal u(n), which has been converted to the analog signal, by using a local signal output from the oscillator 102.

The power amplifying unit 20 includes a power amplifier (PA) 21. The PA 21 amplifies the predistortion signal u(n) output from the up converter 101 at a predetermined amplification factor. The signal amplified by the PA 21 is transmitted to space via the antenna 103.

The coupler 104 outputs a part of the signal amplified by the PA 21 to the down converter 105 as a feedback signal. The down converter 105 performs a process, such as a demodulation process or a down conversion process, on the signal output from the coupler 104 by using a local signal output from the oscillator 102. The ADC 106 converts the signal, which has been output from the down converter 105, from an analog signal to a digital signal. Then, the ADC 106 outputs a feedback signal y(n) that has been converted to the digital signal to the forward characteristic coefficient updating unit 40.

The forward characteristic coefficient updating unit 40 updates the coefficient indicating the forward characteristic of nonlinear distortion of the power amplifying unit 20 based on the feedback signal y(n) and the predistortion signal u(n). The forward characteristic coefficient updating unit 40 includes an LUT 400, a multiplier 401, and a subtracter 402.

The LUT 400 stores therein, in association with the address i, a forward characteristic coefficient $h_i$ that is a model coefficient of the PA 21. The LUT 400 outputs, to the multiplier 401, the forward characteristic coefficient $h_i$ associated with the address i generated by the address generating unit 300. Furthermore, based on an error signal e(n) output from the subtracter 402, the LUT 400 updates the forward characteristic coefficient $h_i$ associated with the address i such that the error signal e(n) is decreased. The LUT 400 updates the forward characteristic coefficient $h_i$ associated with the address i based on, for example, the LMS algorithm or the like. The updated forward characteristic coefficient $h_i$ is output to the forward characteristic coefficient conversion unit 50.

The multiplier 401 generates a replica of a transmission signal y(n), in which the forward characteristic of the nonlinear distortion of the PA 21 has been applied, by multiplying the predistortion signal u(n) output from the distortion compensation unit 30 by the forward characteristic coefficient $h_i$ output from the LUT 400. The subtracter 402 outputs, to the LUT 400, the error signal e(n) indicating a difference between the feedback signal y(n) output from the down converter 105 and the replica of the transmission signal y(n) output from the multiplier 401.

The forward characteristic coefficient conversion unit 50 converts the forward characteristic coefficient $h_i$, which has been updated by the LUT 400, to the coefficient that indicates the inverse characteristic of the PA 21. Then, the forward characteristic coefficient conversion unit 50 updates the distortion compensation coefficient $w_i$ stored in the LUT 301 to the converted coefficient.

Here, the predistortion signal u(n) generated by the multiplier 302 can be expressed by, for example, Equation (1) below.

$$u(n)=w_i x(n) \tag{1}$$

When an output signal of the PA 21 is denoted by y(n), the feedback signal y(n) that has been fed back via the coupler 104 can be expressed by Equation (2) below.

$$y(n)=h_i u(n)=h_i w_i x(n) \tag{2}$$

The forward characteristic coefficient $h_i$ in Equation (2) indicated above is adjusted such that the error signal e(n) indicating an error between a multiplication result of multiplying the predistortion signal u(n) by the forward characteristic coefficient $h_i$ and the feedback signal y(n) output from the ADC 106 is decreased. In a case where the error signal e(n) is 0, this indicates that y(n)=x(n) is satisfied and thus Equation (3) below is satisfied.

$$h_i w_i = 1 \tag{3}$$

that is, $$w_i = \frac{1}{h_i} \tag{4}$$

By using Equation (4) indicated above, the distortion compensation coefficient $w_i$ can be obtained from the forward characteristic coefficient $h_i$. Namely, a reciprocal of the forward characteristic coefficient $h_i$ can be calculated as the distortion compensation coefficient $w_i$.

Configuration of a Distortion Compensation Device 10

Figure 2:
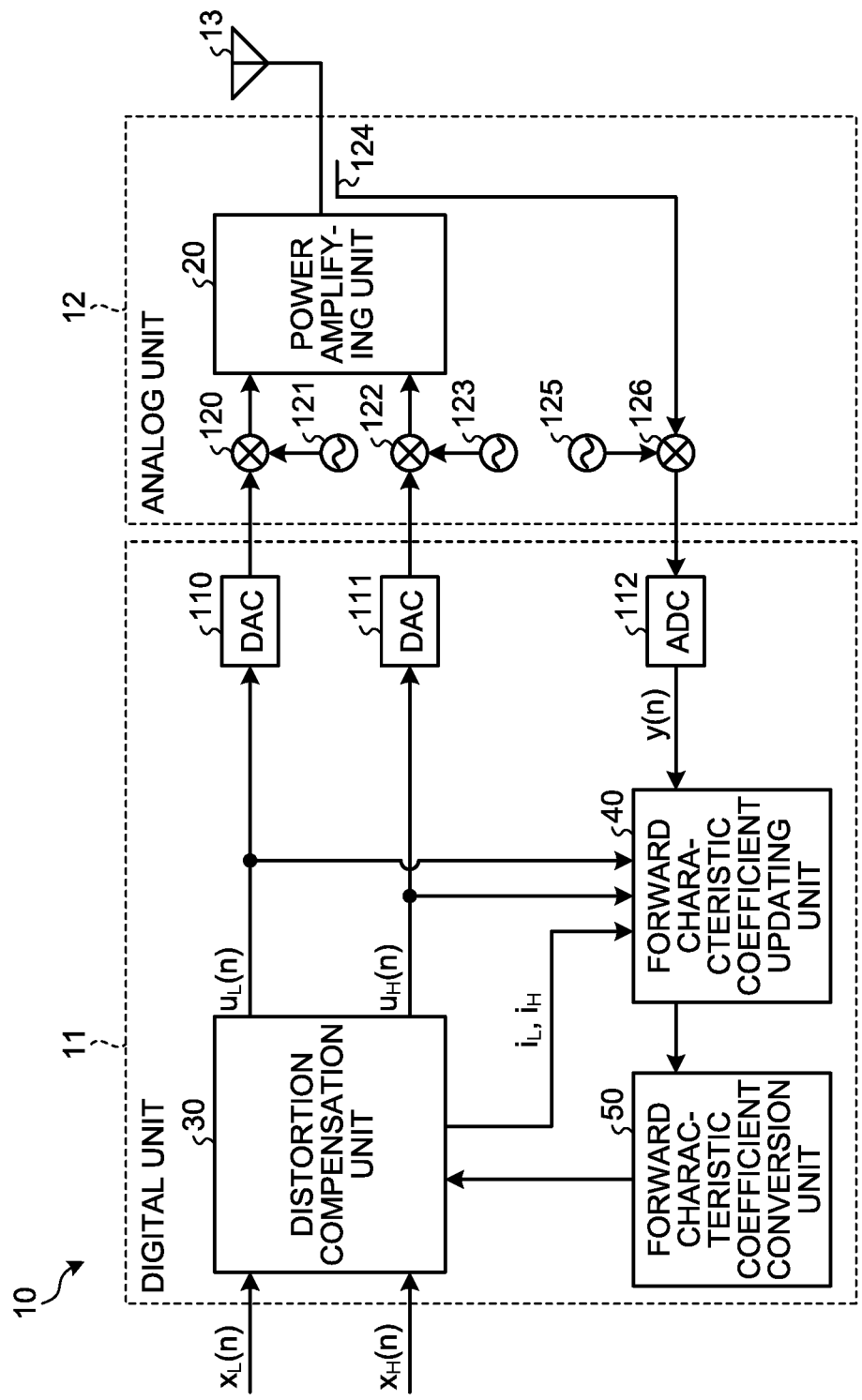
FIG. 2 is a block diagram illustrating an example of a distortion compensation device according to the first embodiment.

FIG. 2 is a block diagram illustrating an example of the distortion compensation device 10 according to the first embodiment. The distortion compensation device 10 according to the embodiment includes a digital unit 11, an analog unit 12, and an antenna 13. The digital unit 11 includes a DAC 110, a DAC 111, an ADC 112, the distortion compensation unit 30, the forward characteristic coefficient updating unit 40, and the forward characteristic coefficient conversion unit 50. The analog unit 12 includes an up converter 120, an oscillator 121, an up converter 122, an oscillator 123, a coupler 124, an oscillator 125, a down converter 126, and the power amplifying unit 20.

The distortion compensation unit 30 generates each of predistortion signals regarding the transmission signals that are transmitted in a plurality of different bands. In the embodiment, the distortion compensation unit 30 generates, regarding transmission signals $x_L(n)$ and $x_H(n)$ having two different bands, predistortion signals $u_L(n)$ and $u_H(n)$, respectively. A process of generating the predistortion signals $u_L(n)$ and $u_H(n)$ is an example of a predistortion process. Furthermore, the distortion compensation unit 30 may also generate each of the predistortion signals u(n) regarding the transmission signals x(n) having three or more different bands.

The DAC 110 converts the predistortion signal $u_L(n)$, which has been output from the distortion compensation unit 30, from a digital signal to an analog signal and then outputs, to the up converter 120, the signal that has been converted to the analog signal. The DAC 111 converts the predistortion signal $u_H(n)$, which has been output from the distortion compensation unit 30, from a digital signal to an analog signal and then outputs, to the up converter 122, the signal that has been converted to the analog signal.

The up converter 120 uses a local signal output from the oscillator 121 and performs a process, such as a modulation process and an up conversion process, on the signal output from the DAC 110. Then, the up converter 120 outputs the processed signal to the power amplifying unit 20. The up converter 122 uses the local signal output from the oscillator 123 and performs a process, such as a modulation process and an up conversion process, on the signal output from the DAC 111. Then, the up converter 122 outputs the processed signal to the power amplifying unit 20. Because the frequency of the local signal output from the oscillator 121 and the frequency of the local signal output from the oscillator 123 are different, the transmission signals $x_L(n)$ and $x_H(n)$ are up converted to signals each of which has a different band.

The power amplifying unit 20 amplifies, at a predetermined amplification factor, the signals each of which has been up converted by the associated up converter 120 or the up converter 122 and has a different band. The signal amplified by the power amplifying unit 20 is transmitted to space from the antenna 13.

The coupler 124 outputs, to the down converter 126, a part of the signal amplified by the power amplifying unit 20. The down converter 126 uses the local signal output from the oscillator 125 and performs a process, such as a demodulation process and a down conversion process, on the signal output from the coupler 124. In the embodiment, the oscillator 125 outputs, to the down converter 126, a frequency positioned at an intermediate between a frequency $f_L$ of the local signal output from the oscillator 121 and a frequency $f_H$ of the local signal output from the oscillator 123. The oscillator 125 outputs, to the down converter 126, the local signal having a frequency $f_0$, where, for example, $f_0=(f_H+f_L)/2$ is satisfied.

Consequently, out of the signals output from the power amplifying unit 20, the signal component having the center frequency of $f_H$ is down converted to a frequency of $f_H-f_0=(f_H-f_L)/2$. Furthermore, out of the signals output from the power amplifying unit 20, the signal component having a center frequency of $f_L$ is down converted to the frequency of $f_0-f_L=(f_H-f_L)/2$, where the spectrum has been folded. Thus, in the baseband with the frequency of $(f_H-f_L)/2$ at the center, an inversion spectrum of the transmission signal $x_L(n)$ and a spectrum of the transmission signal $x_H(n)$ are superimposed. The down converter 126 outputs the superimposed signal to the ADC 112. The down converter 126 is an example of a generating unit.

The ADC 112 converts the signal, which has been output from the down converter 126, from an analog signal to a digital signal. Then, the ADC 112 outputs the signal y(n) that has been converted to the digital signal to the forward characteristic coefficient updating unit 40. In the signal that is fed back via the coupler 124, the transmission signals that are transmitted in the plurality of associated different bands amplified by the power amplifying unit 20 are superimposed. In a description below, the signal y(n) output from the ADC 112 is referred to as a superimposed feedback signal y(n). The superimposed feedback signal y(n) is an example of a superimposed signal.

The forward characteristic coefficient updating unit 40 calculates, based on the superimposed feedback signal y(n) and the predistortion signals $u_L(n)$ and $u_H(n)$, regarding each of the transmission signals $x_L(n)$ and $x_H(n)$, a coefficient indicating the forward characteristic of the nonlinear distortion of the power amplifying unit 20. The forward characteristic coefficient updating unit 40 is an example of a first calculation unit.

The forward characteristic coefficient conversion unit 50 converts, regarding each of the transmission signals $x_L(n)$ and $x_H(n)$, the coefficient calculated by the forward characteristic coefficient updating unit 40 to the coefficient that indicates the inverse characteristic of the nonlinear distortion of the power amplifying unit 20. Then, the forward characteristic coefficient conversion unit 50 outputs, regarding each of the transmission signals $x_L(n)$ and $x_H(n)$, the converted coefficient to the distortion compensation unit 30. The forward characteristic coefficient conversion unit 50 is an example of a first conversion unit. The distortion compensation unit 30 generates, regarding the transmission signals $x_L(n)$ and $x_H(n)$, the predistortion signals $u_L(n)$ and $u_H(n)$, respectively, by using the coefficient output from the forward characteristic coefficient conversion unit 50 as the distortion compensation coefficient.

Power Amplifying Unit 20

Figure 3:
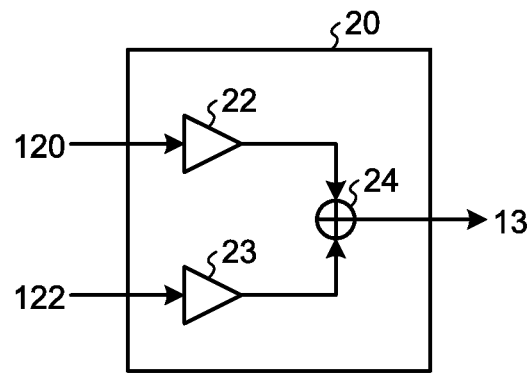
FIG. 3 is a diagram illustrating an example of a power amplifying unit according to the first embodiment.

FIG. 3 is a diagram illustrating an example of a power amplifying unit 20 according to the first embodiment. The power amplifying unit 20 according to the embodiment includes, as illustrated in, for example, FIG. 3, a PA 22, a PA 23, and a combining unit 24. The PA 22 amplifies the predistortion signal $u_L(n)$ output from the up converter 120 at a predetermined amplification factor. The PA 23 amplifies the predistortion signal $u_H(n)$ output from the up converter 122 at a predetermined amplification factor. The combining unit 24 combines the signal amplified by the PA 22 and the signal amplified by the PA 23 and outputs the combined signal to the antenna 13.

Distortion Compensation Unit 30

Figure 4:
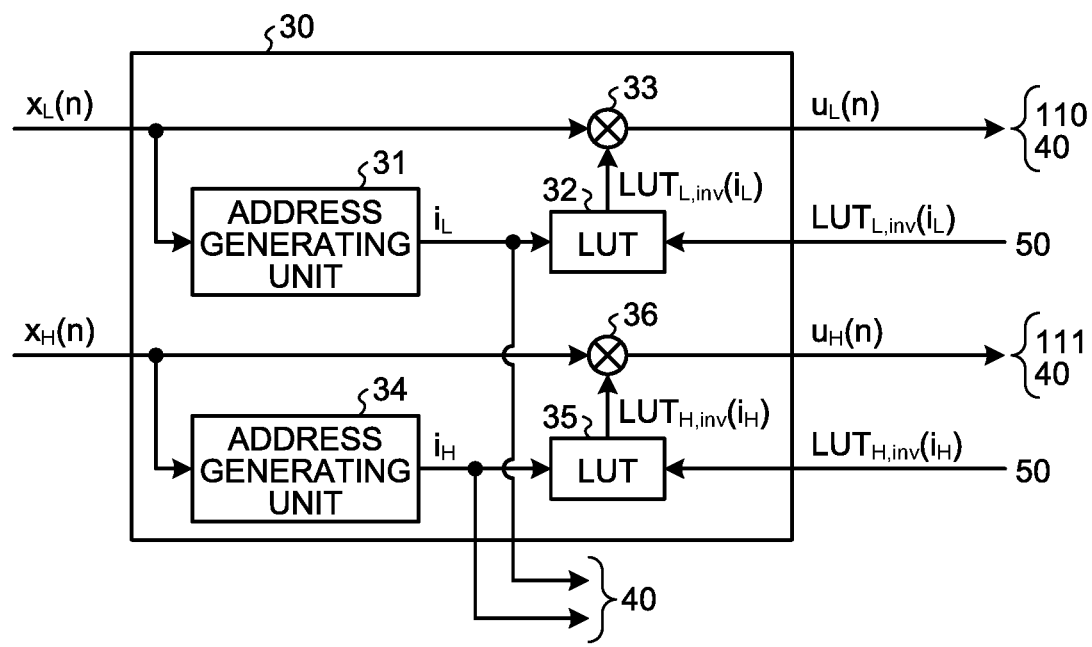
FIG. 4 is a diagram illustrating an example of a distortion compensation unit according to the first embodiment.

FIG. 4 is a diagram illustrating an example of the distortion compensation unit 30 according to the first embodiment. The distortion compensation unit 30 according to the embodiment includes, as illustrated in, for example, FIG. 4, an address generating unit 31, an LUT 32, a multiplier 33, an address generating unit 34, an LUT 35, and a multiplier 36.

The address generating unit 31 generates the address $i_L$ associated with the magnitude of the transmission signal $x_L(n)$ output from the BB processing unit and then outputs the generated address $i_L$ to the LUT 32 and the forward characteristic coefficient updating unit 40. In the embodiment, the address generating unit 31 generates the magnitude of the power of the transmission signal $x_L(n)$ as the address $i_L$. Furthermore, the address generating unit 31 generates the magnitude of the amplitude of the transmission signal $x_L(n)$ as the address $i_L$.

The LUT 32 stores therein, in association with the address $i_L$, a distortion compensation coefficient $LUT_{L,inv}(i_L)$ that indicates the inverse characteristic of the nonlinear distortion of the PA 22. When the number of addresses $i_L$ is denoted by $K_L$ and the power threshold at the time of calculation of the address $i_L$ is denoted by $\alpha_{i_L}$, $\alpha_{i_L} \leq |x_L(n)|^2 < \alpha_{i_L+1}$, and $0 \leq i_L < K_L$ are satisfied. The LUT 32 outputs the distortion compensation coefficient $LUT_{L,inv}(i_L)$ associated with the address $i_L$ generated by the address generating unit 31 to the multiplier 33. Furthermore, the LUT 32 updates the distortion compensation coefficient $LUT_{L,inv}(i_L)$ stored in the LUT 32 by the distortion compensation coefficient $LUT_{L,inv}(i_L)$ output from the forward characteristic coefficient conversion unit 50.

The multiplier 33 generates the predistortion signal $u_L(n)$ by multiplying the transmission signal $x_L(n)$ output from the BB processing unit by the distortion compensation coefficient $LUT_{L,inv}(i_L)$ output from the LUT 32. The predistortion signal $u_L(n)$ is output to the DAC 110 and the forward characteristic coefficient updating unit 40.

The address generating unit 34 generates the address $i_H$ associated with the magnitude of the transmission signal $x_H(n)$ output from the BB processing unit and then outputs the generated address $i_H$ to the LUT 35 and the forward characteristic coefficient updating unit 40. In the embodiment, the address generating unit 34 generates the magnitude of the power of the transmission signal $x_H(n)$ as the address $i_H$. Furthermore, the address generating unit 34 may also generate the magnitude of the amplitude of the transmission signal $x_H(n)$ as the address $i_H$.

the LUT 35 stores therein, in association with the address $i_H$, a distortion compensation coefficient $LUT_{H,inv}(i_H)$ that indicates the inverse characteristic of the nonlinear distortion of the PA 23. When the number of the addresses $i_H$ is denoted by $K_H$ and the power threshold at the time of calculation of the address $i_H$ is denoted by $\beta_{iH}$, $\beta_{iH} \leq |x_H(n)|^2 < \beta_{iH+1}$, and $0 \leq i_H < K_H$ are satisfied. The LUT 35 outputs the distortion compensation coefficient $LUT_{H,inv}(i_H)$ associated with the address $i_H$ generated by the address generating unit 34 to the multiplier 36. Furthermore, the LUT 35 updates the distortion compensation coefficient $LUT_{H,inv}(i_H)$ stored in the LUT 35 to the distortion compensation coefficient $LUT_{H,inv}(i_H)$ output from the forward characteristic coefficient conversion unit 50.

The multiplier 36 generates the predistortion signal $u_H(n)$ by multiplying the transmission signal $x_H(n)$ output from the BB processing unit by the distortion compensation coefficient $LUT_{H,inv}(i_H)$ output from the LUT 35. The predistortion signal $u_H(n)$ is output to the DAC 111 and the forward characteristic coefficient updating unit 40.

Forward Characteristic Coefficient Updating Unit 40

Figure 5:
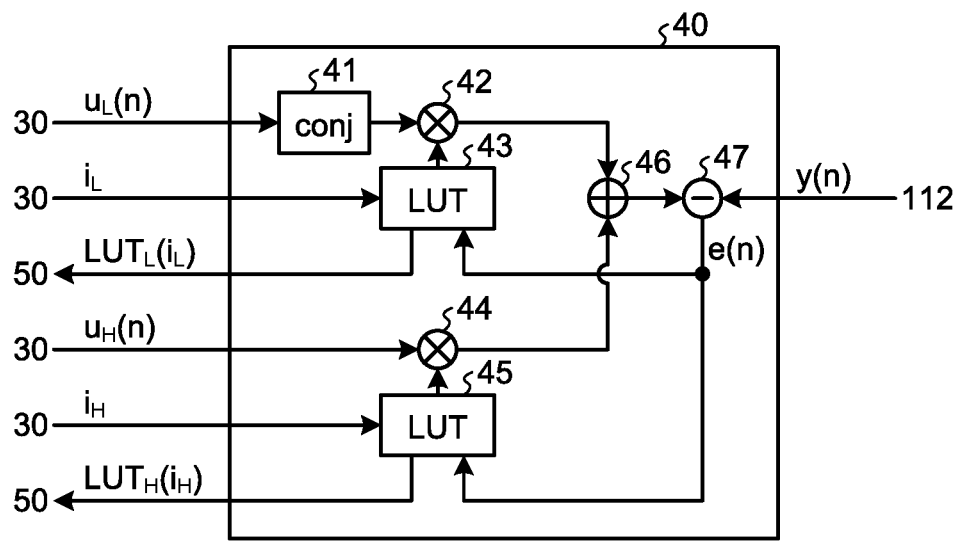
FIG. 5 is a diagram illustrating an example of a forward characteristic coefficient updating unit according to the first embodiment.

FIG. 5 is a diagram illustrating an example of the forward characteristic coefficient updating unit 40 according to the first embodiment. The forward characteristic coefficient updating unit 40 according to the embodiment includes as illustrated in, for example, FIG. 5, an arithmetic calculation unit 41, a multiplier 42, an LUT 43, a multiplier 44, an LUT 45, an adder 46, and a subtracter 47.

The LUT 43 stores therein, in association with the address $i_L$, the forward characteristic coefficient $LUT_L(i_L)$ that indicates the forward characteristic of the nonlinear distortion of the PA 22. The LUT 43 outputs, to the multiplier 42, the forward characteristic coefficient $LUT_L(i_L)$ associated with the address $i_L$ generated by the address generating unit 31 in the distortion compensation unit 30. Furthermore, the LUT 43 updates, based on the error signal $e(n)$ output from the subtracter 47, the forward characteristic coefficient $LUT_L(i_L)$ in the LUT 43 such that the error signal $e(n)$ is decreased. Then, the LUT 43 outputs the updated forward characteristic coefficient $LUT_L(i_L)$ to the forward characteristic coefficient conversion unit 50. The forward characteristic coefficient $LUT_L(i_L)$ in the LUT 43 is updated by using, for example, the LMS algorithm or the like.

The arithmetic calculation unit 41 calculates the complex conjugate of the predistortion signal $u_L(n)$ output from the distortion compensation unit 30. The multiplier 42 generates a replica of the complex conjugate of the transmission signal $x_L(n)$ by multiplying the complex conjugate of the predistortion signal $u_L(n)$ calculated by the arithmetic calculation unit 41 by the forward characteristic coefficient $LUT_L(i_L)$ output from the LUT 43.

The LUT 45 stores therein, in association with the address $i_H$, forward characteristic coefficient $LUT_H(i_H)$ that indicates the forward characteristic of the nonlinear distortion of the PA 23. The LUT 45 outputs, to the multiplier 44, the forward characteristic coefficient $LUT_H(i_H)$ associated with the address $i_H$ generated by the address generating unit 34 in the distortion compensation unit 30. Furthermore, the LUT 45 updates, based on the error signal $e(n)$ output from the subtracter 47, the forward characteristic coefficient $LUT_H(i_H)$ in the LUT 45 such that the error signal $e(n)$ is decreased. Then, the LUT 45 outputs the updated forward characteristic coefficient $LUT_H(i_H)$ to the forward characteristic coefficient conversion unit 50. The forward characteristic coefficient $LUT_H(i_H)$ in the LUT 45 is updated by using, for example, the LMS algorithm or the like.

The multiplier 44 generates a replica of the transmission signal $x_H(n)$ by multiplying the predistortion signal $u_H(n)$ output from the distortion compensation unit 30 by the forward characteristic coefficient $LUT_H(i_H)$ output from the LUT 45.

The adder 46 generates a replica of the superimposed feedback signal $y(n)$ by adding the replica of the complex conjugate of the transmission signal $x_L(n)$ generated by the multiplier 42 to the replica of the transmission signal $x_H(n)$ generated by the multiplier 44.

The subtracter 47 generates the error signal $e(n)$ that indicates a difference between the superimposed feedback signal $y(n)$ output from the ADC 112 and the replica of the superimposed feedback signal $y(n)$ generated by the adder 46. Then, the subtracter 47 outputs the generated error signal $e(n)$ to each of the LUT 43 and the LUT 45.

Forward Characteristic Coefficient Conversion Unit 50

Figure 6:
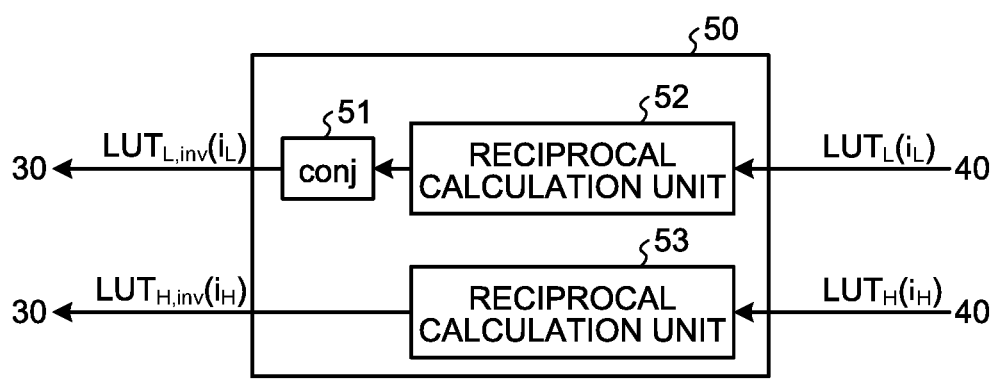
FIG. 6 is a diagram illustrating an example of a forward characteristic coefficient conversion unit according to the first embodiment.

FIG. 6 is a diagram illustrating an example of the forward characteristic coefficient conversion unit 50 according to the first embodiment. The forward characteristic coefficient conversion unit 50 according to the embodiment includes, as illustrated in, for example, FIG. 6, an arithmetic calculation unit 51, a reciprocal calculation unit 52, and a reciprocal calculation unit 53.

The reciprocal calculation unit 52 calculates the reciprocal of the forward characteristic coefficient $LUT_L(i_L)$ output from the LUT 43 in the forward characteristic coefficient updating unit 40. The arithmetic calculation unit 51 calculates the complex conjugate of the reciprocal of the forward characteristic coefficient $LUT_L(i_L)$ calculated by the reciprocal calculation unit 52. Then, the arithmetic calculation unit 51 outputs the calculated complex conjugate of the reciprocal of the forward characteristic coefficient $LUT_L(i_L)$ to the LUT 32 in the distortion compensation unit 30 as the distortion compensation coefficient $LUT_{L,inv}(i_L)$. The reciprocal calculation unit 53 calculates the reciprocal of the forward characteristic coefficient $LUT_H(i_H)$ output from the LUT 45 in the forward characteristic coefficient updating unit 40. Then, the reciprocal calculation unit 53 outputs the calculated reciprocal of the forward characteristic coefficient $LUT_H(i_H)$ to the LUT 35 in the distortion compensation unit 30 as the distortion compensation coefficient $LUT_{H,inv}(i_H)$.

Distortion Compensation Process

Figure 7:
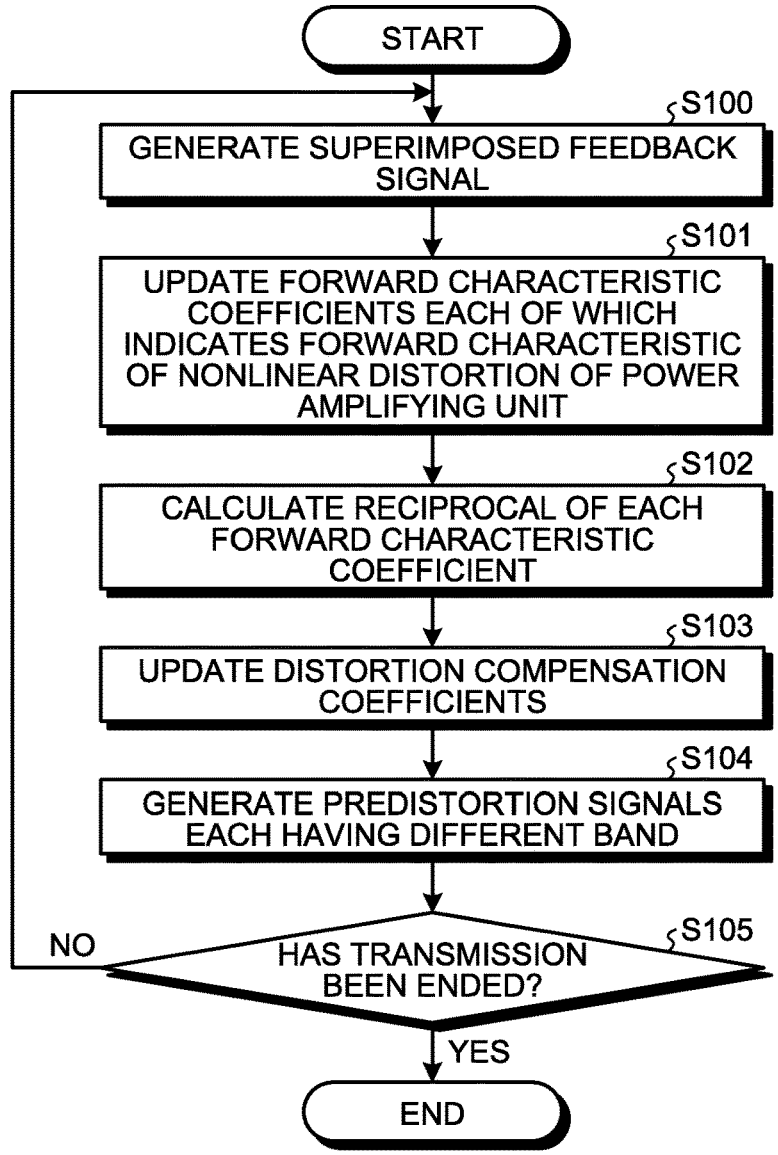
FIG. 7 is a flowchart illustrating an example of a distortion compensation process according to the first embodiment.

FIG. 7 is a flowchart illustrating an example of the distortion compensation process according to the first embodiment.

First, a superimposed feedback signal is generated from the transmission signals having a plurality of different bands amplified by the power amplifying unit 20 (Step S100). At Step S100, a part of the signal amplified by the power amplifying unit 20 is output to the down converter 126 by the coupler 124 and the superimposed feedback signal $y(n)$ is generated by the down converter 126. The superimposed feedback signal $y(n)$ is converted, by the ADC 112, from the analog signal to the digital signal.

Then, the forward characteristic coefficient updating unit 40 updates the forward characteristic coefficients each of which indicates the forward characteristic of the nonlinear distortion of the power amplifying unit 20 by using the superimposed feedback signal $y(n)$, the predistortion signal $u_L(n)$, and the predistortion signal $u_H(n)$ (Step S101).

For example, the replica of the superimposed feedback signal $y(n)$ generated by the adder 46 illustrated in FIG. 5 is expressed by, for example, Equation (5) below.

$$\hat{y}(n) = LUT_L(i_L) u^*_L(n) + LUT_H(i_H) u_H(n) \quad (5)$$

In Equation (5) indicated above, "$u_L^*(n)$" denotes the complex conjugate of $u_L(n)$.

Furthermore, the error signal e(n) generated by the subtracter 47 illustrated in FIG. 5 is expressed by, for example, Equation (6) below.

$$e(n) = y(n) - \hat{y}(n) \quad (6)$$

The LUT 43 and the LUT 45 illustrated in FIG. 5 update the forward characteristic coefficients $LUT_L(i_L)$ and the $LUT_H(i_H)$, respectively, such that the error signal e(n) is decreased. For example, in a case of using the LMS algorithm or the like, each of the forward characteristic coefficients $LUT_L(i_L)$ and the $LUT_H(i_H)$ is updated as indicated by, for example, Equation (7) below.

$$\begin{aligned}LUT_L(i_L) &= LUT_L(i_L) + \mu_L \times e(n) \times \{u_L^*(n)\}^* \\ LUT_H(i_H) &= LUT_H(i_H) + \mu_H \times e(n) \times \{u_H(n)\}^*\end{aligned} \quad (7)$$

In Equation (7) indicated above, $\mu_L$ and $u_H$ denote the step size parameter of each of the bands in the LMS algorithm.

Then, the forward characteristic coefficient conversion unit 50 calculates the reciprocal of each of the forward characteristic coefficients updated by the forward characteristic coefficient updating unit 40 (Step S102). Specifically, the forward characteristic coefficient conversion unit 50 calculates, based on, for example, Equation (8) below, the distortion compensation coefficient $LUT_{L,inv}(i_L)$ from the updated forward characteristic coefficient $LUT_L(i_L)$ and calculates the distortion compensation coefficient $LUT_{H,inv}(i_H)$ from the updated forward characteristic coefficient $LUT_H(i_H)$.

$$\begin{aligned}LUT_{L,inv}(i_L) &= \left\{\frac{1}{LUT_L(i_L)}\right\}^* \\ LUT_{H,inv}(i_H) &= \frac{1}{LUT_H(i_H)}\end{aligned} \quad (8)$$

Then, the distortion compensation coefficients in the distortion compensation unit 30 are updated (Step S103). Specifically, the distortion compensation coefficient $LUT_{L,inv}(i_L)$ in the LUT 32 is updated by the distortion compensation coefficient $LUT_{L,inv}(i_L)$ that has been converted by the forward characteristic coefficient conversion unit 50. Furthermore, the distortion compensation coefficient $LUT_{H,inv}(i_H)$ in the LUT 35 is updated by the distortion compensation coefficient $LUT_{H,inv}(i_H)$ that has been converted by the forward characteristic coefficient conversion unit 50.

Then, the distortion compensation unit 30 generates, by using the updated distortion compensation coefficients, a predistortion signal with respect to the transmission signals each having a different band (Step S104). Specifically, the distortion compensation unit 30 uses the updated distortion compensation coefficients $LUT_{L,inv}(i_L)$ and $LUT_{H,inv}(i_H)$ and generates as expressed by, for example, Equation (9) below, the predistortion signals $u_L(n)$ and $u_H(n)$.

$$\begin{aligned}u_L(n) &= LUT_{L,inv}(i_L)x_L(n) \\ u_H(n) &= LUT_{H,inv}(i_H)x_H(n)\end{aligned} \quad (9)$$

Then, it is determined whether transmission has been ended or not (Step S105). If the transmission has not been ended (No at Step S105), a process indicated at Step S100 is again performed on the transmission signals. In contrast, if the transmission has been ended (Yes at Step S105), the distortion compensation process indicated in the flowchart is ended.

Effects of the First Embodiment

In the above, the first embodiment has been described. As is clear from the description above, the distortion compensation device 10 according to the embodiment includes the down converter 12b, the forward characteristic coefficient updating unit 40, the forward characteristic coefficient conversion unit 50, and the distortion compensation unit 30. The down converter 12b generates, from the output signal output from the power amplifying unit 20 that amplifies transmission signals having a plurality of different bands, a baseband superimposed feedback signal in which the transmission signals having the plurality of different bands are superimposed. The forward characteristic coefficient updating unit 40 calculates, based on the superimposed feedback signal, regarding the transmission signals each having a different band, the coefficient indicating the forward characteristic of the nonlinear distortion of the power amplifying unit 20. The forward characteristic coefficient conversion unit 50 converts, regarding the transmission signals each having the different band, the coefficient calculated by the forward characteristic coefficient updating unit 40 to the coefficient that indicates the inverse characteristic of the nonlinear distortion of the power amplifying unit 20. The distortion compensation unit 30 performs the predistortion process on each of the transmission signals having different bands by using the coefficients converted by the forward characteristic coefficient conversion unit 50. Consequently, the distortion compensation device 10 according to the embodiment can reduce the size of the circuit and power consumption at the time of compensation of the nonlinear distortion of the power amplifying unit 20 in the plurality of bands.

Furthermore, in the distortion compensation device 10 according to the embodiment, the forward characteristic coefficient updating unit 40 calculates, reading the transmission signals each having the different band, a coefficient indicating the forward characteristic of the nonlinear distortion of the power amplifying unit 20 for each magnitude of the transmission signal. Furthermore, the forward characteristic coefficient conversion unit 50 converts, regarding the transmission signals each having the different band, the reciprocal of the coefficient calculated by the forward characteristic coefficient updating unit 40 as the coefficient that indicates the inverse characteristic of the nonlinear distortion of the power amplifying unit 20. Furthermore, the distortion compensation unit 30 performs the predistortion process on each of the transmission signals having the different bands, by multiplying the coefficient converted by the forward characteristic coefficient conversion unit 50 by the transmission signal. Consequently, the distortion compensation device 10 according to the embodiment can reduce the size of the circuit and the power consumption that is used to calculate the coefficient indicating the inverse characteristic of the nonlinear distortion of the power amplifying unit 20.

Furthermore, in the distortion compensation device 10 according to the embodiment, the forward characteristic coefficient updating unit 40 calculates, regarding the transmission signals each having the different band, the coefficient that indicates the forward characteristic of the nonlinear distortion of the power amplifying unit 20 for each magnitude of the transmission signal. The distortion compensation unit 30 performs a predistortion process on each of the transmission signals having the different bands by multiplying the coefficient that is associated with the magnitude of the transmission signal and that is converted by the forward characteristic coefficient conversion unit 50 by the transmission signal. Consequently, the distortion compensation device 10 according to the embodiment can suppress the nonlinear distortion of the power amplifying unit 20 (see FIG. 3) that individually amplifies the transmission signals each having the different band.

[b] Second Embodiment

The distortion compensation device 10 according to the first embodiment compensates the nonlinear distortion of the power amplifying unit 20 by using the LUT; however, in the technique for compensating the nonlinear distortion of the power amplifying unit 20, in addition to the technique that uses the LUT, a technique that uses a series is also present. The distortion compensation device 10 according to the embodiment compensates the nonlinear distortion of the power amplifying unit 20 by using a series. Furthermore, the overall configuration of the distortion compensation device 10 is the same as that of the distortion compensation device 10 according to the first embodiment described with reference to FIG. 2; therefore, descriptions thereof will be omitted. Furthermore, the configuration of the power amplifying unit 20 is also the same as that of the power amplifying unit 20 according to the first embodiment described with reference to FIG. 3; therefore, descriptions thereof will be omitted.

Distortion Compensation Unit 30

Figure 8:
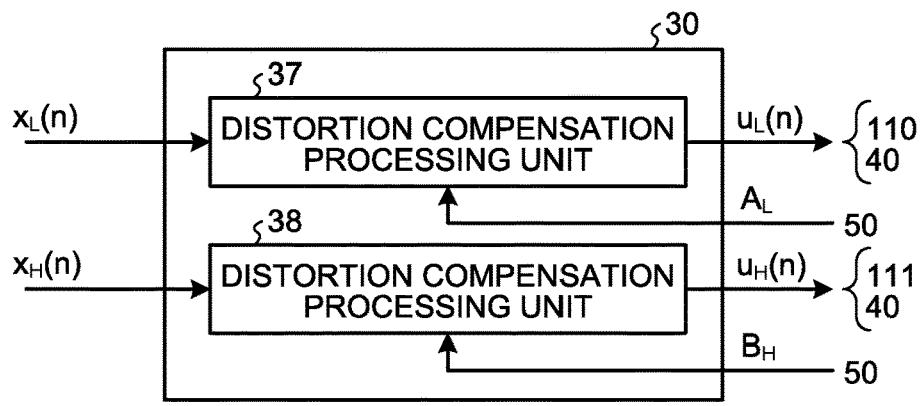
FIG. 8 is a diagram illustrating an example of a distortion compensation unit according to a second embodiment.

FIG. 8 is a diagram illustrating an example of the distortion compensation unit 30 according to a second embodiment. The distortion compensation unit 30 according to the embodiment includes, as illustrated in, for example, FIG. 8, a distortion compensation processing unit 37 and a distortion compensation processing unit 38.

The distortion compensation processing unit 37 generates the predistortion signal $u_L(n)$, in which the inverse characteristic of the nonlinear distortion of the PA 22 has been applied, by performing a series expansion on the transmission signal $x_L(n)$ output from the BB processing unit. The predistortion signal $u_L(n)$ is output to the DAC 110 and the forward characteristic coefficient updating unit 40. Furthermore, the distortion compensation processing unit 37 updates a distortion compensation coefficient $A_L$ that is the coefficient for each term of the series by using the distortion compensation coefficient $A_L$ output from the forward characteristic coefficient conversion unit 50.

The distortion compensation processing unit 38 generates the predistortion signal $u_H(n)$, in which the inverse characteristic of the nonlinear distortion of the PA 23 has been applied, by performing the series expansion on the transmission signal $x_H(n)$ output from the BB processing unit. The predistortion signal $u_H(n)$ is output to the DAC 111 and the forward characteristic coefficient updating unit 40. Furthermore, the distortion compensation processing unit 38 updates a distortion compensation coefficient $B_H$ that is the coefficient of each of the terms in the series by using the distortion compensation coefficient $B_H$ output from the forward characteristic coefficient conversion unit 50.

Forward Characteristic Coefficient Updating Unit 40

Figure 9:
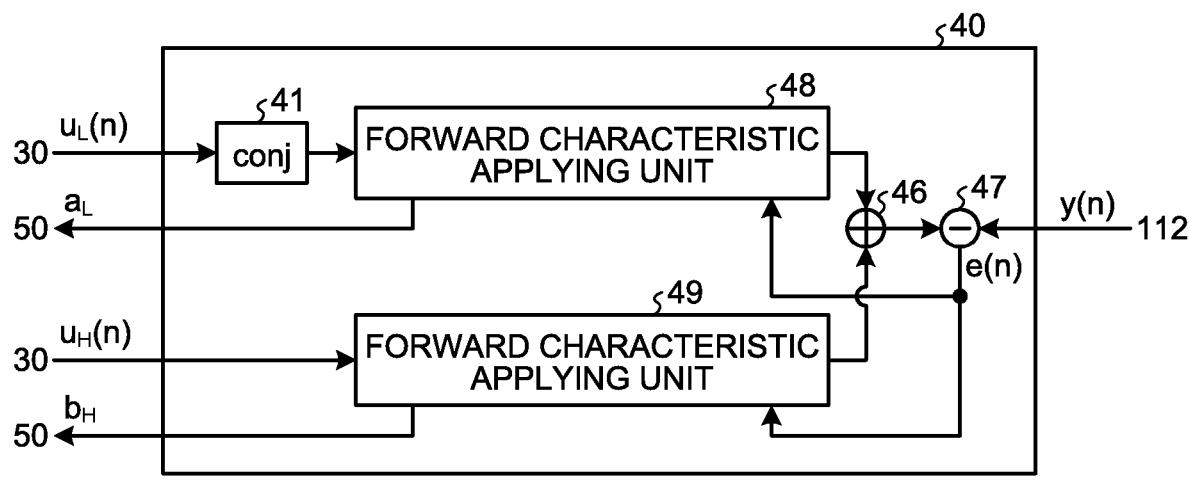
FIG. 9 is a diagram illustrating an example of a forward characteristic coefficient updating unit according to the second embodiment.

FIG. 9 is a diagram illustrating an example of the forward characteristic coefficient updating unit 40 according to the second embodiment. The forward characteristic coefficient updating unit 40 according to the embodiment includes, as illustrated in, for example, FIG. 9, the arithmetic calculation unit 41, the adder 46, the subtracter 47, a forward characteristic applying unit 48, and a forward characteristic applying unit 49. Furthermore, the blocks illustrated in FIG. 9 having the same reference numerals as those illustrated in FIG. 5 have the same configuration as the blocks illustrated in FIG. 5 except for the following points described below; therefore, descriptions thereof in detail will be omitted.

The forward characteristic applying unit 48 generates a signal, in which the forward characteristic of the nonlinear distortion of the PA 22 has been applied to the predistortion signal $u_L(n)$, by performing the series expansion on the complex conjugate of the predistortion signal $u_L(n)$ calculated by the arithmetic calculation unit 41. Furthermore, the forward characteristic applying unit 48 updates, based on the error signal $e(n)$ output from the subtracter 47, a forward characteristic coefficient $a_L$ that is the coefficient of each of the terms in the series such that the error signal $e(n)$ is decreased. The updated forward characteristic coefficient $a_L$ is output to the forward characteristic coefficient conversion unit 50. The update of the forward characteristic coefficient $a_L$ is performed by using, for example, the LMS algorithm or the like.

The forward characteristic applying unit 49 generates a signal, in which the forward characteristic of the nonlinear distortion of the PA 23 has been applied to the predistortion signal $u_H(n)$, by performing the series expansion on the predistortion signal $u_H(n)$ generated by the distortion compensation unit 30. Furthermore, the forward characteristic applying unit 49 updates, based on the error signal $e(n)$ output from the subtracter 47, a forward characteristic coefficient $b_H$ that is the coefficient of each of the terms in the series such that the error signal $e(n)$ is decreased. The updated forward characteristic coefficient $b_H$ is output to the forward characteristic coefficient conversion unit 50. The update of the forward characteristic coefficient $b_H$ is performed by using, for example, the LMS algorithm or the like.

Forward Characteristic Coefficient Conversion Unit 50

Figure 10:
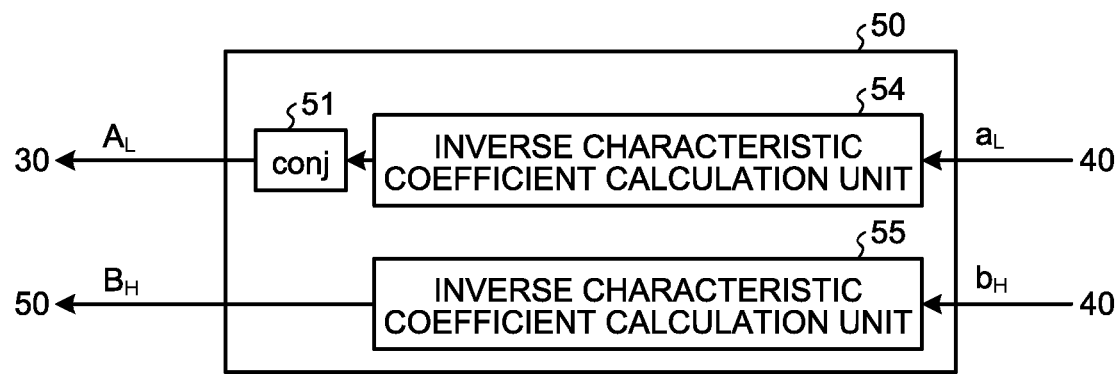
FIG. 10 is a diagram illustrating an example of a forward characteristic coefficient conversion unit according to the second embodiment.

FIG. 10 is a diagram illustrating an example of the forward characteristic coefficient conversion unit 50 according to the second embodiment. The forward characteristic coefficient conversion unit 50 according to the embodiment includes, as illustrated in, for example, FIG. 10, the arithmetic calculation unit 51, an inverse characteristic coefficient calculation unit 54, and an inverse characteristic coefficient calculation unit 55.

The inverse characteristic coefficient calculation unit 54 calculates, based on the forward characteristic coefficient $a_L$ output from the forward characteristic applying unit 48 in the forward characteristic coefficient updating unit 40, the distortion compensation coefficient that is to be set in each of the terms when the inverse characteristic of the nonlinear distortion of the PA 22 is applied to the transmission signal $x_L(n)$ by performing the series expansion. The arithmetic calculation unit 51 calculates the complex conjugate of the distortion compensation coefficient calculated by the inverse characteristic coefficient calculation unit 54. Then, the arithmetic calculation unit 51 outputs the calculated complex conjugate of the coefficient as the distortion compensation coefficient $A_L$ to the distortion compensation processing unit 37 in the distortion compensation unit 30.

The inverse characteristic coefficient calculation unit 55 calculates, based on the forward characteristic coefficient $b_H$ output from the forward characteristic applying unit 49 in the forward characteristic coefficient updating unit 40, the distortion compensation coefficient $B_H$ that is to be set in each term when the inverse characteristic of the nonlinear distortion of the PA 23 is applied to the transmission signal $x_H(n)$ by performing the series expansion. Then, the inverse characteristic coefficient calculation unit 55 outputs the calculated distortion compensation coefficient $B_H$ to the distortion compensation processing unit 38 in the distortion compensation unit 30.

Distortion Compensation Process

Figure 11:
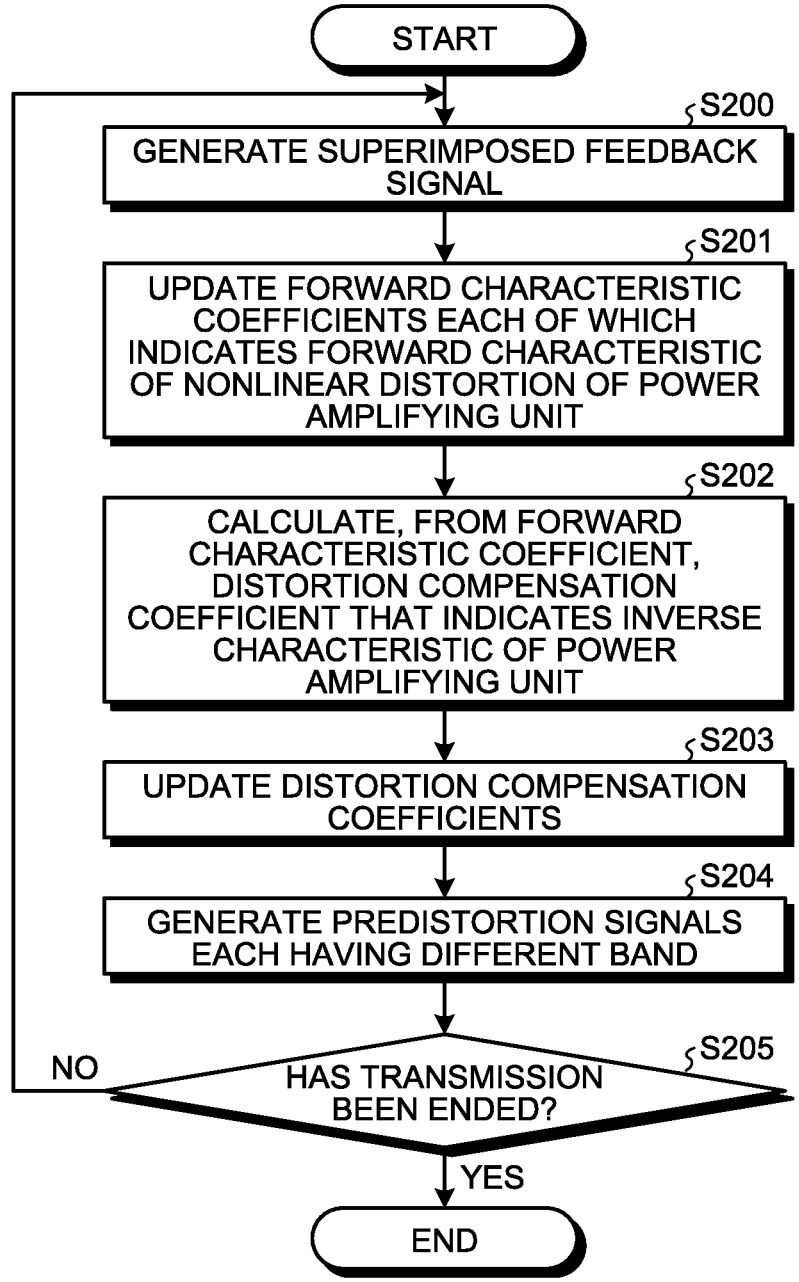
FIG. 11 is a flowchart illustrating an example of a distortion compensation process according to the second embodiment.

FIG. 11 is a flowchart illustrating an example of a distortion compensation process according to the second embodiment.

First, a superimposed feedback signal is generated from the transmission signals that have been amplified by the power amplifying unit 20 and that have the plurality of bands (Step S200). At Step S200, a part of the signal amplified by the power amplifying unit 20 is output to the down converter 126 by the coupler 124 and the superimposed feedback signal y(n) is generated by the down converter 126. The superimposed feedback signal y(n) is converted from an analog signal to a digital signal by the ADC 112.

Then, the forward characteristic coefficient updating unit 40 updates, by using the superimposed feedback signal y(n), the predistortion signal $u_L(n)$, and the predistortion signal $u_H(n)$, the forward characteristic coefficients each of which indicates the forward characteristic of the nonlinear distortion of the power amplifying unit 20 (Step S201).

Then, the forward characteristic coefficient conversion unit 50 calculates, from the forward characteristic coefficients updated by the forward characteristic coefficient updating unit 40, the distortion compensation coefficients each of which indicates the inverse characteristic of the nonlinear distortion of the power amplifying unit 20 (Step S202).

Here, a method for updating the coefficient of each of the terms performed in a distortion compensation technique that uses a series according to the embodiment will be described. In the following, a method for updating the coefficient of the transmission signal $x_L(n)$ will be described; however, the same also applies to the method for updating the coefficient of the transmission signal $x_H(n)$.

The transmission signal replica $y_L(n)$ associated with the transmission signal $x_L(n)$ is represented by, for example, Equation (10) below by using the third-order memoryless polynomial in a forward characteristic model of the power amplifying unit 20.

$$y_L(n) = a_{L1} u_L(n) + a_{L3} |u_L(n)|^2 u_L(n) \tag{10}$$

In Equation (10) indicated above, $a_{L1}$ and $a_{L3}$ denote a model coefficient of the PA 22.

In general, because $a_{L1} \approx 0$ is satisfied, Equation (10) can be transformed to Equation (11) below.

$$u_L(n) = \frac{1}{a_{L1}} y_L(n) - \frac{a_{L3}}{a_{L1}} |u_L(n)|^2 u_L(n) \tag{11}$$

If Equation (10) indicated above is sequentially substituted in the right side of Equation (11) indicated above, Equation (11) above can be transformed to Equation (12) below.

$$u_L(n) = \frac{1}{a_{L1}} y_L(n) - \frac{a_{L3}}{a_{L1}} \left| \frac{1}{a_{L1}} y_L(n) - \frac{a_{L3}}{a_{L1}} |u_L(n)|^2 u_L(n) \right|^2 \tag{12}$$

$$\left( \frac{1}{a_{L1}} y_L(n) - \frac{a_{L3}}{a_{L1}} |u_L(n)|^2 u_L(n) \right)$$

-continued $$= \frac{1}{a_{L1}} y_L(n) - \frac{a_{L3}}{a_{L1}} \left( \frac{1}{a_{L1}} y_L(n) - \frac{a_{L3}}{a_{L1}} |u_L(n)|^2 u_L(n) \right)^*$$

$$\left( \frac{1}{a_{L1}} y_L(n) - \frac{a_{L3}}{a_{L1}} |u_L(n)|^2 u_L(n) \right)$$

$$\left( \frac{1}{a_{L1}} y_L(n) - \frac{a_{L3}}{a_{L1}} |u_L(n)|^2 u_L(n) \right)$$

$$= \frac{1}{a_{L1}} y_L(n) - \frac{a_{L3}}{a_{L1}} \left( \frac{1}{a_{L1}|a_{L1}|^2} |y_L(n)|^2 y_L(n) - \right.$$

$$\frac{2a_{L3}}{a_{L1}|a_{L1}|^2} |y_L(n)|^2 |u_L(n)|^2 u_L(n) +$$

$$\frac{a_{L3}^2}{a_{L1}|a_L|^2} |u_L(n)|^4 \{y_L(n)\}^8 \{u_L(n)\}^2 -$$

$$\frac{a_{L3}^*}{a_{L1}|a_{L1}|^2} |u_L(n)|^2 \{y_L(n)\}^2 \{u_L(n)\}^6 +$$

$$\frac{2|a_{L3}|^2}{a_{L1}|a_{L1}|^2} |u_L(n)|^6 y_L(n) - \frac{a_{L3}|a_{L3}|^2}{a_{L1}|a_{L1}|^2} |u_L(n)|^8 u_L(n) \right)$$

$$= \frac{1}{a_{L1}} y_L(n) - \frac{a_{L3}}{a_{L1}^2|a_{L1}|^2} |y_L(n)|^2 y_L(n) + \ldots$$

Furthermore, the inverse characteristic model of the PA 22 in the third-order memoryless polynomial can be expressed by, for example, Equation (13) below.

$$u_L(n) = A_{L1} y_L(n) + A_{L3} |y_L(n)|^2 y_L(n) \tag{13}$$

When the coefficients of each of the terms in the series indicated by Equation (12) above are compared with the coefficients of each of the terms in the series indicated by Equation (13) above, each of the coefficients has relationship indicated by Equation (14) below.

$$\left. \begin{array}{l} A_{L1} = \frac{1}{a_{L1}} \\ A_{L3} = -\frac{a_{L3}}{a_{L1}^2|a_{L1}|^2} \end{array} \right\} \tag{14}$$

If the series is the third-order memoryless polynomial, the inverse characteristic coefficient calculation unit 54 in the forward characteristic coefficient conversion unit 50 can calculate, by using Equation (14) above, from the forward characteristic coefficient $a_L$ that indicates the forward characteristic of the power amplifying unit 20, the distortion compensation coefficient $A_L$ that indicates the inverse characteristic of the power amplifying unit 20. The same applies to a memoryless polynomial of an order of fifth or more.

Then, each of the distortion compensation coefficients that are used in the distortion compensation processing unit 37 and the distortion compensation processing unit 38 in the distortion compensation unit 30 is updated (Step S203). Then, each of the distortion compensation processing unit 37 and the distortion compensation processing unit 38 generates the predistortion signal with respect to the transmission signals each having a different band by using the updated distortion compensation coefficient (Step S204).

Then, whether or not transmission has been ended is determined (Step S205). If the transmission has not been ended (No at Step S205), the process indicated at Step S200 is again performed on the transmission signals. In contrast, if the transmission has been ended (Yes at Step S205), the distortion compensation process indicated by the flowchart is ended.

Comparative Example

Figure 12:
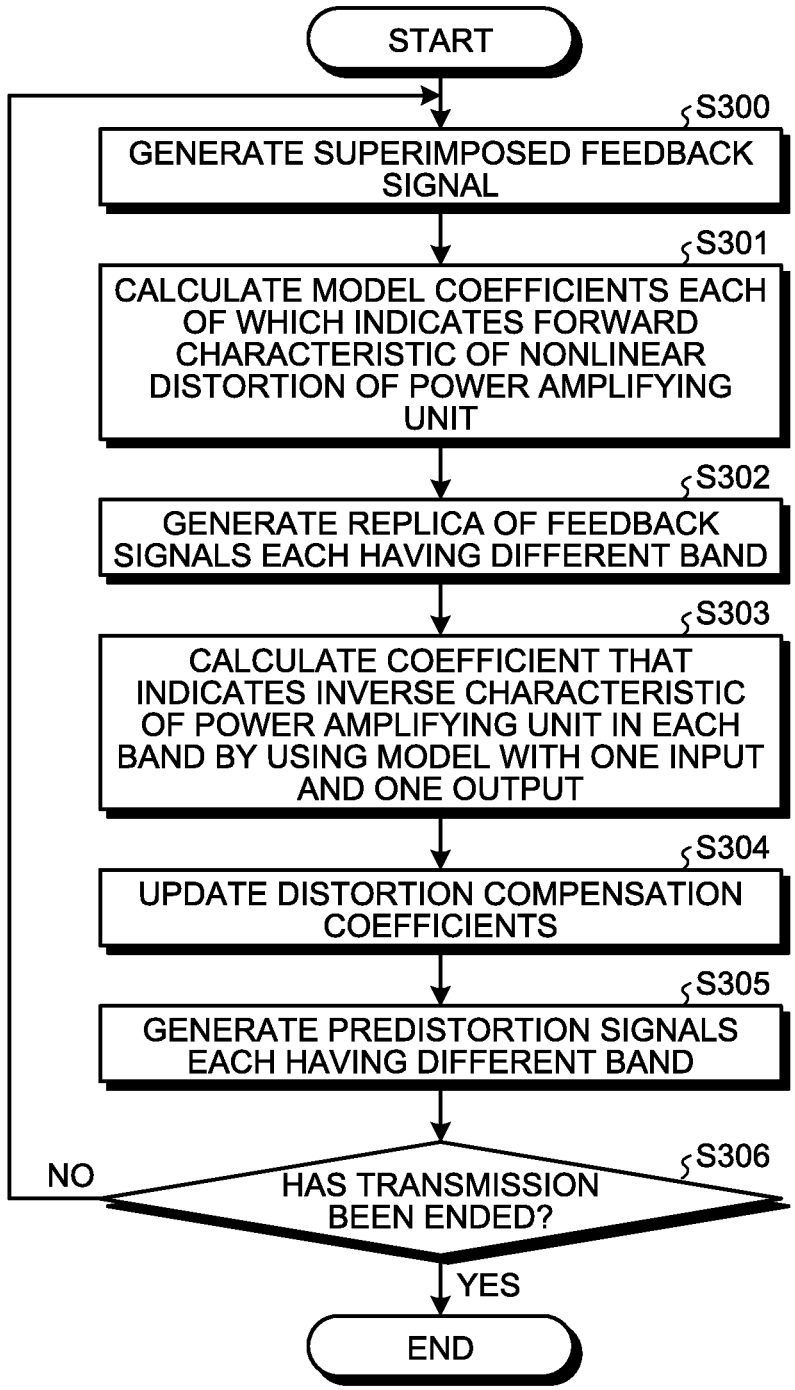
FIG. 12 is a flowchart illustrating an example of a distortion compensation process according to a comparative example.

In the following, a distortion compensation process in a comparative example will be described. FIG. 12 is a flowchart illustrating an example of the distortion compensation process according to the comparative example. In the comparative example, regarding each of the bands, a replica of the transmission signal output from the power amplifying unit 20 is generated and then, by combining the replicas of the transmission signals having different bands, a replica of the superimposed feedback signal is generated. Then, regarding each of the bands, the forward characteristic coefficient that indicates the forward characteristic of the nonlinear distortion of the power amplifying unit 20 used for generating the replica of the transmission signal is calculated by using the LMS algorithm or the like such that a difference between the superimposed feedback signal and the replica of the superimposed feedback signal is decreased. Then, the inverse characteristic coefficient that indicates the inverse characteristic of the nonlinear distortion of the power amplifying unit 20 is calculated from the forward characteristic coefficient by using the LMS algorithm or the like.

First, a superimposed feedback signal is generated from the transmission signals having a plurality of bands amplified by the power amplifying unit 20 (Step S300). Then, the model coefficients each of which indicates the forward characteristic of the nonlinear distortion of the PA 22 and the PA 23 included in the power amplifying unit 20 is calculated (Step S301).

If a forward characteristic model of the power amplifying unit 20 is represented by using a series-type memoryless polynomial, the transmission signal replica $y_L(n)$ associated with the transmission signal $x_L(n)$ and the transmission signal $y_H(n)$ associated with the transmission signal $x_H(n)$ can be expressed by, for example, Equation (15) below.

$$\left. \begin{array}{l} y_L(n) = \sum_{p=1}^{P} a_p |u_L(n)|^{p-1} u_L(n) \\ y_H(n) = \sum_{q=1}^{Q} b_q |u_H(n)|^{q-1} u_H(n) \end{array} \right\} \quad (15)$$

In Equation (15) above, $a_p$ denotes the model coefficient of the forward characteristic of the nonlinear distortion of the PA 22 and $b_q$ denotes the model coefficient of the forward characteristic of the nonlinear distortion of the PA 23. Furthermore, P and Q, which are natural numbers, denote the order of the nonlinear distortion, and p and q are odd numbers.

The model coefficient of the forward characteristic of the power amplifying unit 20 is calculated by using each of the predistortion signal $u_L(n)$ associated with the transmission signal $x_L(n)$ and the predistortion signal $u_H(n)$ associated with the transmission signal $x_H(n)$ as an input and by using the superimposed feedback signal y(n) as an output. Namely, the forward characteristic model of the power amplifying unit 20 is expressed by the model with two inputs and one output. The inverse characteristic model of the power amplifying unit 20 becomes the model with one input and two outputs, in which the superimposed feedback signal y(n) is used as an input and each of the predistortion signal $u_L(n)$ and the predistortion signal $u_H(n)$ is used as an output and has a condition in which the number of outputs is greater than the number of inputs. In this way, because it is difficult to directly obtain the inverse characteristic model, the forward characteristic model is thus obtained. The superimposed feedback signal y(n) is expressed by, for example, Equation (16) below.

$$y(n) = \{y_L(n)\}^* + y_H(n) \quad (16)$$

Equation (16) indicated above can be expressed in the matrix form by, for example, Equation (17) below.

$$y = Zh \quad (17)$$

where, the definition of each of the elements expressed in Equation (17) above is as follows.

$$\left. \begin{array}{l} y = [\, y(n) \quad y(n+1) \quad \ldots \quad y(n+N-1)\,]^T \\ Z = [\, Z_L^* \quad Z_H \,] \\ Z_L = [\, z_L(n) \quad z_L(n+1) \quad \ldots \quad z_L(n+N-1)\,]^T \\ z_L(k) = [\, u_L(k) \quad |u_L(k)|^2 u_L(k) \quad \ldots \quad |u_L(k)|^{P-1} u_L(k)\,] \\ Z_H = [\, z_H(n) \quad z_H(n+1) \quad \ldots \quad z_H(n+N-1)\,]^T \\ z_H(k) = [\, u_H(k) \quad |u_H(k)|^2 u_H(k) \quad \ldots \quad |u_H(k)|^{Q-1} u_H(k)\,] \\ h = [\, a^T \quad b^T \,]^T \\ a = [\, a_1 \quad a_3 \quad a_5 \quad \ldots \quad a_P\,]^T \\ b = [\, b_1 \quad b_3 \quad b_5 \quad \ldots \quad b_Q\,]^T \end{array} \right\} \quad (18)$$

By estimating an unknown complex coefficient vector h based on the superimposed feedback signal y(n) and the matrix Z by using Equation (19), it is possible to calculate a model coefficient $a_p$ of the forward characteristic of the PA 22 and a model coefficient $b_q$ of the forward characteristic of the PA 23.

$$h = (Z^H Z)^{-1} Z^H y \quad (19)$$

Then, the calculated model coefficient $a_p$ is copied to the arithmetic calculation unit that applies the forward characteristic of the PA 22 to the predistortion signal $u_L(n)$ and the calculated model coefficient $b_q$ is copied to the arithmetic calculation unit that applies the forward characteristic of the PA 23 to the predistortion signal $u_H(n)$. Then, by using Equation (15) indicated above, the replica of each of the feedback signals $y_L(n)$ and $y_H(n)$ in the associated bands is generated (Step S302).

Then, by using the calculated replica of each of the feedback signals having the associated bands, the distortion compensation coefficient indicating the inverse characteristic of nonlinear distortion of each of the PA 22 and the PA 23 is calculated (Step S303). Namely, based on the model with one input and one output, in which the replica of the feedback signal $y_L(n)$ is an input and the predistortion signal $u_L(n)$ is an output, a distortion compensation coefficient A indicating the inverse characteristic of the nonlinear distortion of the PA 22 is calculated by using, for example, Equation (20) below. Similarly, based on the model with one input and one output, in which the replica of the feedback signal $y_H(n)$ is used as an input and the predistortion signal $u_H(n)$ is used as an output, a distortion compensation coefficient B indicating the inverse characteristic of the nonlinear distortion of the PA 23 is calculated by using, for example, Equation (20) below.

$$\left. \begin{array}{l} A = (W_L^H W_L)^{-1} W_L^H u_L \\ B = (W_H^H W_H)^{-1} W_H^H u_H \end{array} \right\} \quad (20)$$

where, the definition of each of the elements expressed in Equation (20) above is as follows.

$$A = [\begin{array}{cccc} A_1 & A_3 & A_5 & \ldots & A_P \end{array}]^T \qquad (21)$$
$$B = [\begin{array}{cccc} B_1 & B_3 & B_5 & \ldots & B_Q \end{array}]^T$$
$$W_L = [\begin{array}{cccc} w_L(n) & w_L(n+1) & \ldots & w_L(n+N-1) \end{array}]^T$$
$$w_L(k) = [\begin{array}{cccc} y_L(k) & |y_L(k)|^2 y_L(k) & \ldots & |y_L(k)|^{P-1} y_L(k) \end{array}]$$
$$W_H = [\begin{array}{cccc} w_H(n) & w_H(n+1) & \ldots & w_H(n+N-1) \end{array}]^T$$
$$w_H(k) = [\begin{array}{cccc} y_H(k) & |y_H(k)|^2 y_H(k) & \ldots & |y_H(k)|^{Q-1} y_H(k) \end{array}]$$
$$u_L = [\begin{array}{cccc} u_L(n) & u_L(n+1) & \ldots & u_L(n+N-1) \end{array}]^T$$
$$u_H = [\begin{array}{cccc} u_H(n) & u_H(n+1) & \ldots & u_H(n+N-1) \end{array}]^T$$

Then, the calculated distortion compensation coefficient A is copied to the distortion compensation unit that generates the predistortion signal $u_L(n)$ and the calculated distortion compensation coefficient B is copied to the distortion compensation unit that generates the predistortion signal $u_H(n)$, whereby the distortion compensation coefficients are updated (Step S304). Then, each of the distortion compensation units generates, by using Equation (22) below, the predistortion signals $u_L(n)$ and $u_H(n)$ in the associated bands (Step S305).

$$u_L(n) = \sum_{p=1}^{P} A_p |x_L(n)|^{p-1} x_L(n) \qquad (22)$$
$$u_H(n) = \sum_{q=1}^{Q} B_q |x_H(n)|^{q-1} x_H(n)$$

Then, whether or not transmission has been ended is determined (Step S306). If the transmission has not been ended (No at Step S306), the process indicated at Step S300 is again performed on the transmission signals. In contrast, if the transmission has been ended (Yes at Step S306), the distortion compensation process in the comparative example indicated by the flowchart is ended.

When comparing the distortion compensation process performed in the second embodiment with the distortion compensation process performed in the comparative example, in the distortion compensation process performed in the second embodiment, the process, performed at Step S302, of generating a replica of the feedback signal in each of the bands is not needed. Furthermore, in the distortion compensation process, performed at Step S202 in the second embodiment, the distortion compensation coefficient indicating the inverse characteristic of the power amplifying unit 20 is calculated from the forward characteristic coefficient. In contrast, in the comparative example, at Step S303, the distortion compensation coefficient indicating the inverse characteristic of the power amplifying unit 20 in each of the bands is calculated by using the model with one input and one output.

The process performed at Step S202 in the embodiment is the process in which digital arithmetic calculation is performed on each of the coefficients at a time irrespective of the number of samples. In contrast, the processes at Steps S302 and S303 are the processes in each of which digital arithmetic calculation corresponding to an amount of the number of samples is performed; therefore, an amount of arithmetic calculation is great. Thus, the distortion compensation device 10 that is used in the second embodiment and in which the processes at Steps S302 and S303 are not needed can reduce the circuit size of the digital unit when compared with the distortion compensation device that is used in the comparative example and can reduce power consumption by an amount that is to be decreased in digital arithmetic calculation processing.

Effects of the Second Embodiment

In the above, the second embodiment has been described. In also the distortion compensation device 10 according to the embodiment, it is also possible to reduce the circuit size and reduce power consumption by an amount corresponding to the reduced size of the circuit.

[c] Third Embodiment

In the first embodiment, the predistortion signals each having a different band are amplified by the associated PA 22 and the PA 23, combined thereafter, and then output from the antenna 13. In contrast, in a third embodiment, after the predistortion signals having a plurality of bands are combined, amplified thereafter by a single PA, and then output from the antenna 13. Furthermore, the overall configuration of the distortion compensation device 10 is the same as that of the distortion compensation device 10 according to the first embodiment with reference to FIG. 2; therefore, descriptions thereof will be omitted.

Power Amplifying Unit 20

Figure 13:
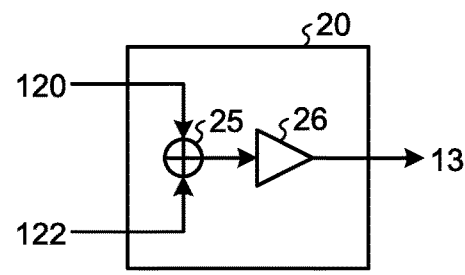
FIG. 13 is a diagram illustrating an example of a power amplifying unit according to a third embodiment.

FIG. 13 is a diagram illustrating an example of the power amplifying unit 20 according to a third embodiment. The power amplifying unit 20 according to the embodiment includes, as illustrated in, for example, FIG. 13, a combining unit 25 and a PA 26. The combining unit 25 combines the predistortion signal $u_L(n)$ that is output from the up converter 120 and the predistortion signal $u_H(n)$ that is output from the up converter 122. The PA 26 amplifies the predistortion signal, which has been combined by the combining unit 25, at a predetermined amplification factor. The signal amplified by the PA 26 is transmitted to space via the antenna 13.

Distortion Compensation Unit 30

Figure 14:
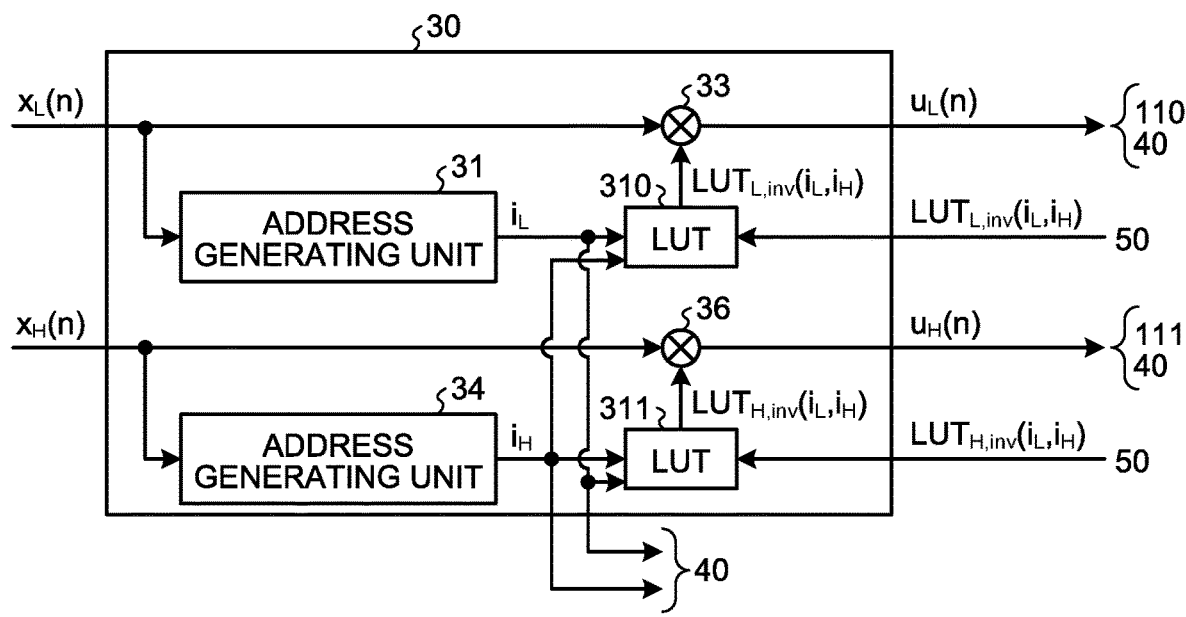
FIG. 14 is a diagram illustrating an example of a distortion compensation unit according to the third embodiment.

FIG. 14 is a diagram illustrating an example of the distortion compensation unit 30 according to the third embodiment. The distortion compensation unit 30 according to the embodiment includes, as illustrated in, for example, FIG. 14, the address generating unit 31, the multiplier 33, the address generating unit 34, the multiplier 36, an LUT 310, and an LUT 311. Furthermore, the blocks illustrated in FIG. 14 having the same reference numerals as those illustrated in FIG. 4 have the same configuration as the blocks illustrated in FIG. 4 except for the following points described below; therefore, descriptions thereof in detail will be omitted.

The LUT 310 stores therein, in association with the combination of the addresses $i_L$ and $i_H$, the distortion compensation coefficients $LUT_{L,inv}(i_L, i_H)$ that indicate the inverse characteristic of nonlinear distortion of the PA 26 in the band in which the transmission signal $x_L(n)$ is transmitted. The LUT 310 outputs, to the multiplier 33, the distortion compensation coefficients $LUT_{L,inv}(i_L, i_H)$ associated with the address $i_L$ generated by the address generating unit 31 and the address $i_H$ generated by the address generating unit 34. Furthermore, the LUT 310 updates the distortion compensation coefficients $LUT_{L,inv}(i_L, i_H)$ stored in the LUT 310 with the distortion compensation coefficients $LUT_{L,inv}(i_L, i_H)$ that have been output from the forward characteristic coefficient conversion unit 50.

The LUT 311 stores therein, in association with the combination of the addresses $i_L$ and $i_H$, the distortion compensation coefficients $\text{LUT}_{H,inv}(i_L, i_H)$ that indicate the inverse characteristic of nonlinear distortion of the PA 26 in the band in which the transmission signal $x_H(n)$ is transmitted. The LUT 311 outputs, to the multiplier 36, the distortion compensation coefficients $\text{LUT}_{H,inv}(i_L, i_H)$ associated with the address $i_L$ generated by the address generating unit 31 and the address $i_H$ generated by the address generating unit 34. Furthermore, the LUT 311 updates the distortion compensation coefficients $\text{LUT}_{H,inv}(i_L, i_H)$ stored in the LUT 311 with the distortion compensation coefficients $\text{LUT}_{H,inv}(i_L, i_H)$ that have been output from the forward characteristic coefficient conversion unit 50.

Forward Characteristic Coefficient Updating Unit 40

Figure 15:
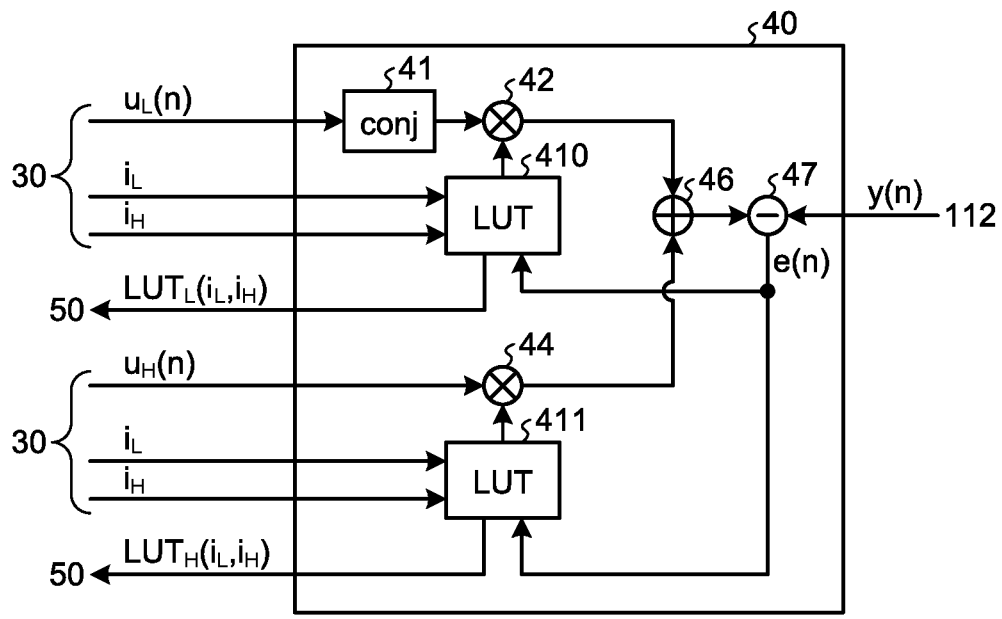
FIG. 15 is a diagram illustrating an example of a forward characteristic coefficient updating unit according to the third embodiment.

FIG. 15 is a diagram illustrating an example of the forward characteristic coefficient updating unit 40 according to the third embodiment. The forward characteristic coefficient updating unit 40 according to the embodiment includes, as illustrated in, for example, FIG. 15, the arithmetic calculation unit 41, the multiplier 42, the multiplier 44, the adder 46, the subtracter 47, an LUT 410, and an LUT 411. Furthermore, the blocks illustrated in FIG. 15 having the same reference numerals as those illustrated in FIG. 5 have the same configuration as the blocks illustrated in FIG. 5 except for the following points described below; therefore, descriptions thereof in detail will be omitted.

The LUT 410 stores therein, in association with the combination of the addresses $i_L$ and $i_H$, the forward characteristic coefficients $\text{LUT}_L(i_L, i_H)$ that indicate the forward characteristic of the nonlinear distortion of the PA 26. The LUT 410 outputs, to the multiplier 42, the forward characteristic coefficients $\text{LUT}_L(i_L, i_H)$ associated with the combination of the address $i_L$ generated by the address generating unit 31 and the address $i_H$ generated by the address generating unit 34. Furthermore, the LUT 410 updates, based on the error signal e(n) output from the subtracter 47, the forward characteristic coefficients $\text{LUT}_L(i_L, i_H)$ stored in the LUT 410 such that the error signal e(n) is decreased. Then, the LUT 410 outputs the updated forward characteristic coefficients $\text{LUT}_L(i_L, i_H)$ to the forward characteristic coefficient conversion unit 50. The forward characteristic coefficients $\text{LUT}_L(i_L, i_H)$ stored in the LUT 410 are updated by using, for example, the LMS algorithm or the like.

The LUT 411 stores therein, in association with the addresses $i_L$ and $i_H$, the forward characteristic coefficients $\text{LUT}_H(i_L, i_H)$ that indicates the forward characteristic of the nonlinear distortion of the PA 26. The LUT 411 outputs, to the multiplier 44, the forward characteristic coefficients $\text{LUT}_H(i_L, i_H)$ associated with the combination of the address $i_L$ generated by the address generating unit 31 and the address $i_H$ generated by the address generating unit 34. Furthermore, the LUT 411 updates, based on the error signal e(n) output from the subtracter 47, the forward characteristic coefficients $\text{LUT}_H(i_L, i_H)$ stored in the LUT 411 such that the error signal e(n) is decreased. Then, the LUT 411 outputs the updated forward characteristic coefficients $\text{LUT}_H(i_L, i_H)$ to the forward characteristic coefficient conversion unit 50. The forward characteristic coefficients $\text{LUT}_H(i_L, i_H)$ stored in the LUT 411 are updated by using, for example, the LMS algorithm or the like.

Forward Characteristic Coefficient Conversion Unit 50

Figure 16:
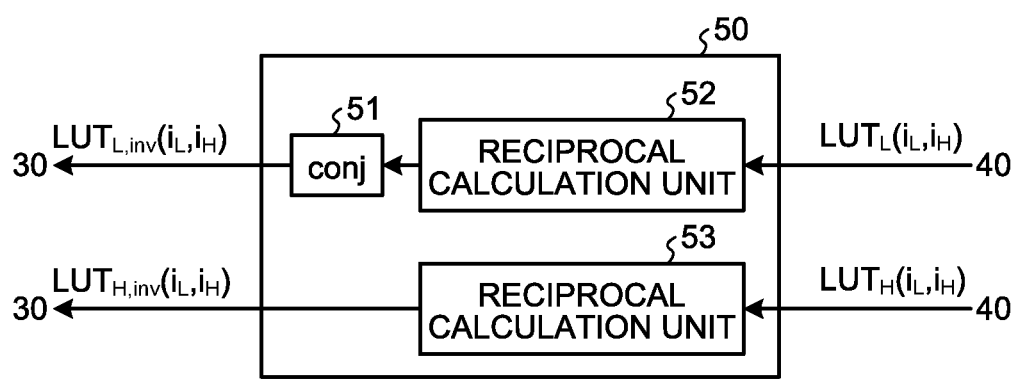
FIG. 16 is a diagram illustrating an example of a forward characteristic coefficient conversion unit according to the third embodiment.

FIG. 16 is a diagram illustrating an example of the forward characteristic coefficient conversion unit 50 according to the third embodiment. The forward characteristic coefficient conversion unit 50 according to the embodiment includes, as illustrated in, for example, FIG. 16, the arithmetic calculation unit 51, the reciprocal calculation unit 52, and the reciprocal calculation unit 53.

The reciprocal calculation unit 52 calculates the reciprocal of the forward characteristic coefficients $\text{LUT}_L(i_L, i_H)$ that have been output from the LUT 410 in the forward characteristic coefficient updating unit 40. The arithmetic calculation unit 51 calculates the complex conjugate of the reciprocal of the forward characteristic coefficients $\text{LUT}_L(i_L, i_H)$ calculated by the reciprocal calculation unit 52. Then, the arithmetic calculation unit 51 outputs, to the LUT 310 in the distortion compensation unit 30, the complex conjugate of the reciprocal of the forward characteristic coefficients $\text{LUT}_L(i_L, i_H)$ as the distortion compensation coefficients $\text{LUT}_{L,inv}(i_L, i_H)$. The reciprocal calculation unit 53 calculates the reciprocal of each of the forward characteristic coefficients $\text{LUT}_H(i_L, i_H)$ output from the LUT 411 in the forward characteristic coefficient updating unit 40. Then, the reciprocal calculation unit 53 outputs, to the LUT 311 in the distortion compensation unit 30, the reciprocal of each of the forward characteristic coefficients $\text{LUT}_H(i_L, i_H)$ as the distortion compensation coefficients $\text{LUT}_{H,inv}(i_L, i_H)$.

Here, the process of updating the distortion compensation coefficients according to the embodiment can be summarized as follows. For example, the replica of the superimposed feedback signal y(n) generated by the adder 46 illustrated in FIG. 15 can be expressed by, for example, Equation (23) below.

$$\hat{y}(n) = \text{LUT}_L(i_L, i_H)u^*_L(n) + \text{LUT}_H(i_L, i_H)u_H(n) \qquad (23)$$

Furthermore, the error signal e(n) generated by the subtracter 47 illustrated in FIG. 15 can be expressed by Equation (6) indicated above. The LUT 410 and the LUT 411 illustrated in FIG. 15 update the forward characteristic coefficients $\text{LUT}_L(i_L, i_H)$ and $\text{LUT}_H(i_L, i_H)$ such that the error signal e(n) is decreased. For example, when using the LMS algorithm or the like, the forward characteristic coefficients $\text{LUT}_L(i_L, i_H)$ and $\text{LUT}_H(i_L, i_H)$ are updated as indicated by, for example, Equation (24) below.

$$\left. \begin{array}{l} \text{LUT}_L(i_L, i_H) = \text{LUT}_L(i_L, i_H) + \mu_L \times e(n) \times \{u^*_L(n)\}^* \\ \text{LUT}_H(i_L, i_H) = \text{LUT}_H(i_L, i_H) + \mu_H \times e(n) \times \{u_H(n)\}^* \end{array} \right\} \qquad (24)$$

Then, based on, for example, Equation (25) below, the forward characteristic coefficient conversion unit 50 calculates the distortion compensation coefficients $\text{LUT}_{L,inv}(i_L, i_H)$ from the updated forward characteristic coefficients $\text{LUT}_L(i_L, i_H)$ and calculates the distortion compensation coefficients $\text{LUT}_{H,inv}(i_L, i_H)$ from the updated forward characteristic coefficients $\text{LUT}_H(i_L, i_H)$.

$$\left. \begin{array}{l} \text{LUT}_{L,inv}(i_L, i_H) = \left\{ \dfrac{1}{\text{LUT}_L(i_L, i_H)} \right\}^* \\ \text{LUT}_{H,inv}(i_L, i_H) = \dfrac{1}{\text{LUT}_H(i_L, i_H)} \end{array} \right\} \qquad (25)$$

Then, the distortion compensation coefficients $\text{LUT}_{L,inv}(i_L, i_H)$ stored in the LUT 310 included in the distortion compensation unit 30 is updated by the distortion compensation coefficients $\text{LUT}_{L,inv}(i_L, i_H)$ that have been converted by the forward characteristic coefficient conversion unit 50. Furthermore, the distortion compensation coefficients $\text{LUT}_{H,inv}(i_L, i_H)$ stored in the LUT 311 is updated by the distortion compensation coefficients $\text{LUT}_{H,inv}(i_L, i_H)$ that have been converted by the forward characteristic coefficient conversion unit 50.

Then, by using the updated distortion compensation coefficients $LUT_{L,inv}(i_L, i_H)$ and $LUT_{H,inv}(i_L, i_H)$, the distortion compensation unit 30 generates each of the predistortion signals $u_L(n)$ and $u_H(n)$ as indicated by, for example, Equation (26) below.

$$\left. \begin{array}{l} u_L(n) = LUT_{L,inv}(i_L, i_H) x_L(n) \\ u_H(n) = LUT_{H,inv}(i_L, i_H) x_H(n) \end{array} \right\} \quad (26)$$

Effects of the Third Embodiment

In the above, the third embodiment has been described. As is clear from the description above, in the embodiment, the forward characteristic coefficient updating unit 40 calculates, regarding the transmission signals each having the different band, the coefficient that indicates the forward characteristic of nonlinear distortion of the power amplifying unit 20 for each combination of the magnitudes of the transmission signals having the plurality of different bands. The distortion compensation unit 30 performs the predistortion process on the transmission signals each having a different band by multiplying the transmission signal by the coefficient that is associated with the combination of each combination of the magnitudes of the transmission signals having the plurality of different bands and that has been converted by the forward characteristic coefficient conversion unit 50. Consequently, the distortion compensation device 10 according to the embodiment can suppress nonlinear distortion of the power amplifying unit 20 (see FIG. 13) that concurrently amplifies the transmission signals each having the different band.

[d] Fourth Embodiment

In a power amplifier with high power efficiency, it is known that a phenomenon called memory effect occurs. The memory effect is a phenomenon in which an output with respect to an input to an amplifier at a certain time point is affected by an input performed at a past time point. The distortion compensation device 10 according to the embodiment collectively compensates nonlinear distortion of the power amplifying unit 20 due to the memory effect.

Distortion Compensation Device 10

Figure 17:
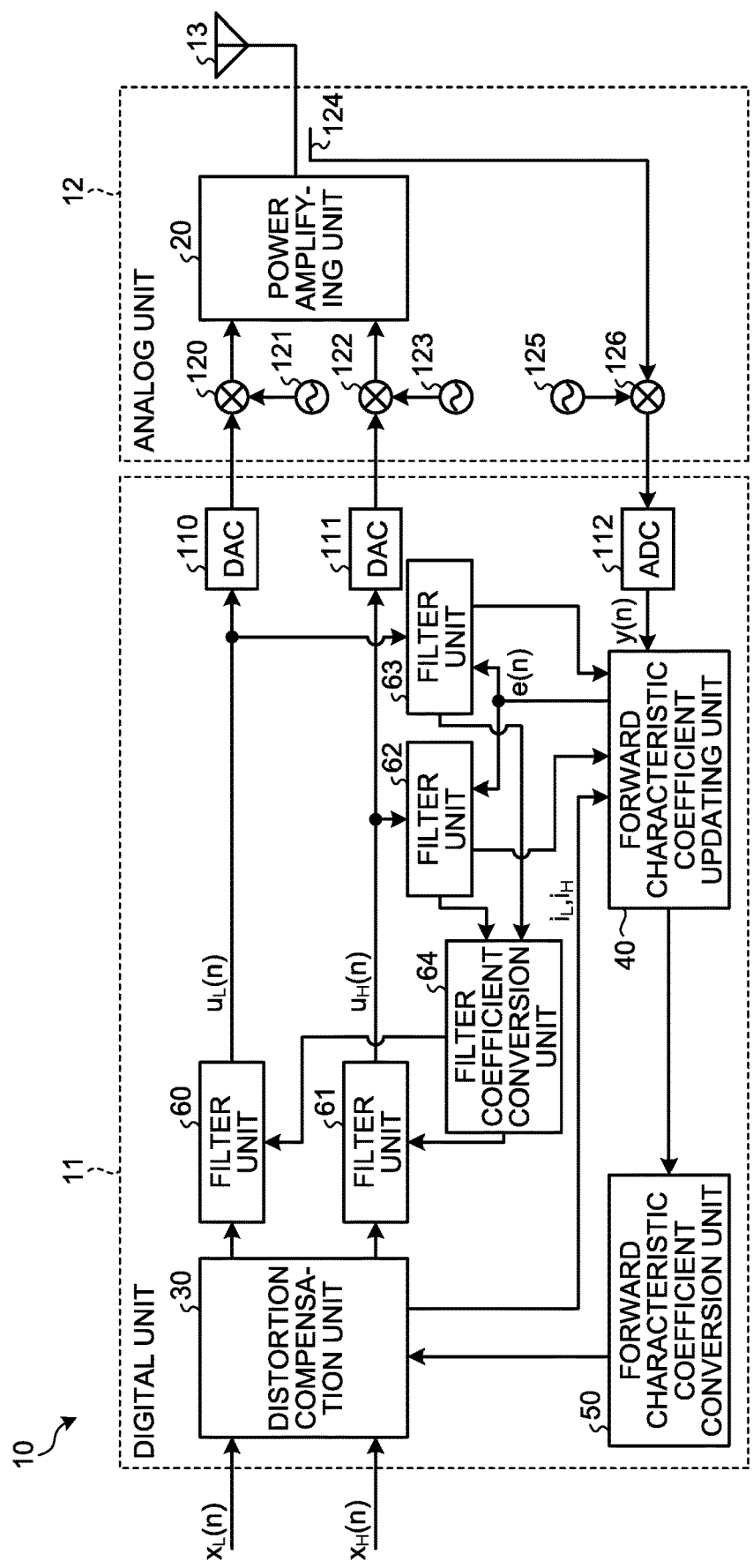
FIG. 17 is a block diagram illustrating an example of a distortion compensation device according to a fourth embodiment.

FIG. 17 is a block diagram illustrating an example of the distortion compensation device 10 according to a fourth embodiment. The distortion compensation device 10 according to the embodiment includes the digital unit 11, the analog unit 12, and the antenna 13. The digital unit 11 includes the DAC 110, the DAC 111, the ADC 112, the distortion compensation unit 30, the forward characteristic coefficient updating unit 40, the forward characteristic coefficient conversion unit 50, a plurality of filter units 60 to 63, and a filter coefficient conversion unit 64. The analog unit 12 includes the up converter 120, the oscillator 121, the up converter 122, the oscillator 123, the coupler 124, the oscillator 125, the down converter 126, and the power amplifying unit 20. Furthermore, the blocks illustrated in FIG. 17 having the same reference numerals as those illustrated in FIG. 2 have the same configuration as the blocks illustrated in FIG. 2 except for the following points described below; therefore, descriptions thereof in detail will be omitted.

The filter unit 60 applies an inverse characteristic of nonlinear distortion due to the memory effect of the power amplifying unit 20 to the predistortion signal $u_L(n)$ in which the inverse characteristic of the nonlinear distortion of the power amplifying unit 20 is applied to the transmission signal $x_L(n)$ by the distortion compensation unit 30. Furthermore, if the filter coefficient is output from the filter coefficient conversion unit 64, the filter unit 60 updates, by the filter coefficient output from the filter coefficient conversion unit 64, the filter coefficient that is used when the inverse characteristic of nonlinear distortion of the power amplifying unit 20 is applied to the predistortion signal $u_L(n)$.

The filter unit 61 applies the inverse characteristic of the nonlinear distortion caused by the memory effect of the power amplifying unit 20 to the predistortion signal $u_H(n)$ in which the inverse characteristic of nonlinear distortion of the power amplifying unit 20 is applied to the transmission signal $x_H(n)$ by the distortion compensation unit 30. Furthermore, if the filter coefficient is output from the filter coefficient conversion unit 64, the filter unit 61 updates, by the filter coefficient output from the filter coefficient conversion unit 64, the filter coefficient that is used when the inverse characteristic of nonlinear distortion of the power amplifying unit 20 is applied to the predistortion signal $u_H(n)$. The filter units 60 and 61 are examples of an applying unit.

Figure 18:
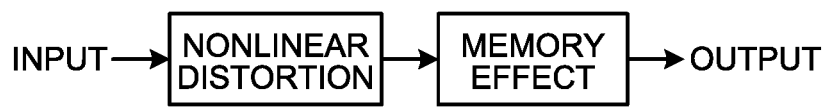
FIG. 18 is a diagram for explaining a Hammerstein model.
Figure 19:
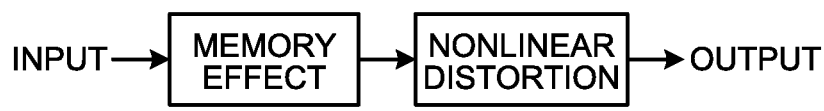
FIG. 19 is a diagram for explaining a Wiener model.
Figure 20:
FIG. 20 is a diagram for explaining a Wiener-Hammerstein model.

As the nonlinear distortion model caused by the memory effect of the power amplifier, the Hammerstein model illustrated in FIG. 18, the Wiener model illustrated in FIG. 19, the Wiener-Hammerstein model illustrated in FIG. 20, and the like are known. The relationship between the distortion compensation unit 30 and the filter unit 60 and the relationship between the distortion compensation unit 30 and the filter unit 61 are the relationship corresponding to that of the Hammerstein model.

The filter unit 63 applies the forward characteristic of nonlinear distortion caused by the memory effect of the power amplifying unit 20 to the predistortion signal $u_L(n)$ in which the inverse characteristic of nonlinear distortion caused by the memory effect of the power amplifying unit 20 is applied by the filter unit 60. The predistortion signal $u_L(n)$, in which the forward characteristic of nonlinear distortion caused by the memory effect of the power amplifying unit 20 has been applied, is input to the arithmetic calculation unit 41 (see FIG. 5) included in the forward characteristic coefficient updating unit 40 and then the forward characteristic of nonlinear distortion of the power amplifying unit 20 is applied by the multiplier 42 (see FIG. 5). Furthermore, the filter unit 63 updates the filter coefficient that is used to apply the forward characteristic of nonlinear distortion caused by the memory effect such that the error signal $e(n)$ that has been output from the subtracter 47 (see FIG. 5) included in the forward characteristic coefficient updating unit 40 is decreased. The updated filter coefficient is output to the filter coefficient conversion unit 64.

The filter unit 62 applies the forward characteristic of nonlinear distortion caused by the memory effect of the power amplifying unit 20 to the predistortion signal $u_H(n)$, in which the inverse characteristic of nonlinear distortion caused by the memory effect of the power amplifying unit 20 has been applied by the filter unit 61. The predistortion signal $u_H(n)$, in which the forward characteristic of nonlinear distortion caused by the memory effect of the power amplifying unit 20 has been applied, is input to the multiplier 44 (see FIG. 5) included in the forward characteristic coefficient updating unit 40 and then the forward characteristic of nonlinear distortion of the power amplifying unit 20 is applied by the multiplier 44. Furthermore, the filter unit 62 updates the filter coefficient that is used to apply the forward characteristic of nonlinear distortion caused by the memory effect such that the error signal e(n) output from the subtracter 47 (see FIG. 5) included in the forward characteristic coefficient updating unit 40 is decreased. The updated filter coefficient is output to the filter coefficient conversion unit 64.

The relationship between the filter unit 62 and the forward characteristic coefficient updating unit 40 and the relationship between the filter unit 63 and the forward characteristic coefficient updating unit 40 are the relationship corresponding to that of the Wiener model. In the embodiment, each of the filter units 60 to 63 is implemented by, for example, a finite impulse response (FIR) filter or an infinite impulse response (IIR) filter. The filter coefficient is a tap coefficient of, for example, an FIR filter or an IIR filter. The filter units 62 and 63 are examples of a second calculation unit.

The filter coefficient conversion unit 64 converts the filter coefficient that is used to apply the forward characteristic of nonlinear distortion caused by the memory effect updated by each of the filter unit 62 and the filter unit 63 to the filter coefficient that is used to apply the inverse characteristic of nonlinear distortion of the memory effect. Then, the filter coefficient conversion unit 64 outputs, to the filter unit 60, the filter coefficient that has been converted from the filter coefficient that was output from the filter unit 63 and outputs, to the filter unit 61, the filter coefficient that has been converted from the filter coefficient output that was output from the filter unit 62.

The filter coefficient conversion unit 64 converts, based on, for example, a predetermined inverse characteristic conversion equation, the filter coefficient, which is used to apply the forward characteristic of nonlinear distortion caused by the memory effect, to the filter coefficient that is used to apply the inverse characteristic. Furthermore, after having temporarily converted the filter coefficient that is used to apply the forward characteristic of nonlinear distortion caused by the memory effect from the time domain to the frequency domain, the filter coefficient conversion unit 64 may also obtain a reciprocal of each of the coefficients and then again convert the filter coefficient from the frequency domain to the time domain. Even in this case, the filter coefficient conversion unit 64 can also convert the filter coefficient that is used to apply the forward characteristic of nonlinear distortion caused by the memory effect to the filter coefficient that is used to apply the inverse characteristic. The filter coefficient conversion unit 64 is an example of a second conversion unit.

Furthermore, in the embodiment, the configuration in which the forward characteristic of nonlinear distortion caused by the memory effect is applied is regarded as the configuration that is in accordance with the Wiener model, whereas the configuration in which the inverse characteristic of nonlinear distortion caused by the memory effect is applied is regarded as the configuration that is in accordance with the Hammerstein model. However, the disclosed technology is not limited to this. For example, the configuration in which the forward characteristic of the nonlinear distortion caused by the memory effect is applied may also be regarded as the configuration in accordance with the Hammerstein model, whereas the configuration in which the inverse characteristic of the nonlinear distortion caused by the memory effect is applied may also be regarded as the configuration that is in accordance with the Wiener model. Furthermore, both of the configuration in which the forward characteristic of the nonlinear distortion caused by the memory effect is applied and the configuration in which the inverse characteristic of the nonlinear distortion caused by the memory effect is applied may also be regarded as the configuration that is in accordance with the Wiener-Hammerstein model.

Effects of the Fourth Embodiment

In the above, the fourth embodiment has been described. As is clear from the description above, the distortion compensation device 10 according to the embodiment includes the plurality of the filter unit 60 to the filter unit 63 and the filter coefficient conversion unit 64. The filter unit 62 and the filter unit 63 calculates, regarding each of the transmission signals having different bands, the coefficient indicating the forward characteristic of the memory effect of the power amplifying unit 20. The filter coefficient conversion unit 64 converts, regarding each of the transmission signals having different bands, the coefficient that has been calculated by each of the filter unit 62 and the filter unit 63 to the coefficient that indicates the inverse characteristic of the memory effect of the power amplifying unit 20. Each of the filter unit 60 and the filter unit 61 applies, to the transmission signals having different bands, the inverse characteristic of the memory effect of the power amplifying unit 20 by using the coefficient converted by the filter coefficient conversion unit 64. Consequently, the distortion compensation device 10 can reduce the nonlinear distortion caused by the memory effect.

Furthermore, in the embodiment described above, each of the forward characteristic and the inverse characteristic of the memory effect of the power amplifying unit 20 is implemented by an FIR filter or an IIR filter. Furthermore, each of the coefficient of the forward characteristic of the memory effect and the coefficient of the inverse characteristic of the memory effect is the tap coefficient of the FIR filter of the IIR filter. Consequently, it is possible to implement the circuit that can reduce nonlinear distortion caused by the memory effect.

Hardware

Figure 21:
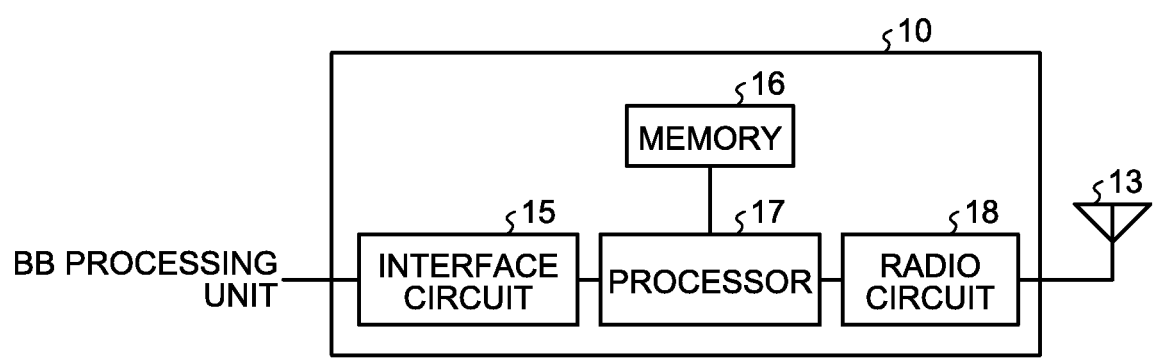
FIG. 21 is a diagram illustrating an example of hardware of the distortion compensation device.

The distortion compensation device 10 according to the first to the fourth embodiments can be implemented by the hardware illustrated in, for example FIG. 21. FIG. 21 is a diagram illustrating an example of the hardware of the distortion compensation device 10. The distortion compensation device 10 includes, as illustrated in, for example, FIG. 21, the antenna 13, an interface circuit 15, a memory 16, a processor 17, and a radio circuit 18.

The radio circuit 18 performs a process, such as an up conversion process, on the signal output from the processor 17 and transmits the processed signal via the antenna 13. Furthermore, the radio circuit 18 includes a power amplifier, performs a process, such as a down conversion process, on a part of the signal output form the power amplifier and feeds back the processed signal to the processor 17. The radio circuit 18 implements the function of, for example, the DAC 110, the DAC 111, the ADC 112, and the analog unit 12. The interface circuit 15 receives the transmission signals from the BB processing unit and then outputs the received transmission signals to the processor 17.

The memory 16 stores therein various programs or the like for implementing the function of, for example, the distortion compensation unit 30, the forward characteristic coefficient updating unit 40, the forward characteristic coefficient conversion unit 50, the plurality of the filter units 60 to 63, and the filter coefficient conversion unit 64. The processor 17 implements each of the functions of, for example, the distortion compensation unit 30, the forward characteristic coefficient updating unit 40, the forward characteristic coefficient conversion unit 50, the plurality of the filter units 60 to 63, and the filter coefficient conversion unit 64 by executing the programs read from the memory 16.

Furthermore, in the distortion compensation device 10 illustrated in FIG. 21 as an example, the number of each of the antenna 13, the interface circuit 15, the memory 16, the processor 17, and the radio circuit 18 is one; however, two or more components may also be provided in the distortion compensation device 10.

Furthermore, the programs, the data, or the like in the memory 16 do not need to be stored in the memory 16 from the beginning. For example, each program, the data, or the like may also be stored in a portable recording medium, such as a memory card, or the like, inserted in the distortion compensation device 10 and the processor 17 may also acquire the programs, the data, or the like from the portable recording medium and executes the programs. Furthermore, the distortion compensation device 10 may also acquire each of the programs from another computer, a server device, or the like that stores therein each of the programs, the data, or the like via a wireless communication line, a public circuit, the Internet, a LAN, a WAN, or the like.

Others

Furthermore, the technology disclosed in the present invention is not limited to the embodiments described above and various modifications are possible as long as they do not depart from the spirit of the present invention.

For example, in the first and the third embodiments described above, a single LUT has been assigned to the predistortion process performed on each of the transmission signals having different bands; however, the disclosed technology is not limited to this. For example, it is possible to use a plurality of LUTs each of which holds distortion compensation coefficients each having a different time delay amount with respect to the transmission signals each having a different band. Consequently, it is possible to compensate the memory effect of the power amplifying unit 20.

Furthermore, in the second and the fourth embodiments described above, each of the transmission signals having different bands is individually amplified by the associated PA 22 and the PA 23; however, the disclosed technology is not limited to this. In also the second and the fourth embodiments, similarly to the third embodiment, after the predistortion signals having a plurality of bands have been combined, the predistortion signal may also be amplified by a single PA.

According to an aspect of an embodiment, it is possible to reduce the circuit size and power consumption at the time of compensation of nonlinear distortion of the power amplifying unit in a plurality of bands.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A distortion compensation device comprising:
a memory; and
a processor coupled to the memory, wherein the processor executes a process comprising:
generating from an output signal of a power amplifier that amplifies transmission signals having a plurality of different bands, a superimposed signal in which the transmission signals having the plurality of different bands have been superimposed;
calculating, based on the superimposed signal, a first coefficient indicating a forward characteristic of nonlinear distortion of the power amplifier associated with each of the transmission signals having the different bands;
converting the first coefficient to a second coefficient indicating an inverse characteristic of the nonlinear distortion of the power amplifier; and
performing, by using the second coefficients, a predistortion process on each of the transmission signals having the different bands,
wherein
the calculating the first coefficient includes calculating the first coefficient indicating the forward characteristic of the nonlinear distortion of the power amplifier for each magnitude of the transmission signal associated with each of the transmission signals having the different bands,
the converting the first coefficient includes calculating a reciprocal of the first coefficient as the second coefficient indicating the inverse characteristic of the nonlinear distortion of the power amplifier, and
the performing the predistortion process includes multiplying the second coefficient by the associated transmission signal.

2. The distortion compensation device according to claim 1, wherein
the calculating the first coefficient includes calculating the first coefficient indicating the forward characteristic of the nonlinear distortion of the power amplifier for each magnitude of the transmission signal associated with each of the transmission signals having the different bands, and
the performing the predistortion process includes multiplying the second coefficient, which is associated with the magnitude of the transmission signal, by the transmission signal.

3. The distortion compensation device according to claim 1, wherein
the calculating the first coefficient includes calculating the first coefficient indicating the forward characteristic of the nonlinear distortion of the power amplifier for each combination of the magnitudes of the transmission signals having the plurality of different bands, and
the performing the predistortion process includes multiplying the second coefficient, which is associated with each of the combinations of the magnitudes of the transmission signals having the plurality of different bands, by the transmission signal.

4. The distortion compensation device according to claim 1, wherein the process further comprising:
calculating a third coefficient indicating a forward characteristic of memory effect of the power amplifier associated with each of the transmission signals having the different bands;
converting the third coefficient to a fourth coefficient indicating an inverse characteristic of the memory effect of the power amplifier; and
applying, to each of the transmission signals having the different bands, the inverse characteristic of the memory effect using the fourth coefficient.

5. The distortion compensation device according to claim 4, wherein
the forward characteristic and the inverse characteristic of the memory effect of the power amplifier is implemented by a finite impulse response (FIR) filter or an infinite impulse response (IIR) filter, and
the third coefficient of the forward characteristic of the memory effect and the fourth coefficient of the inverse characteristic of the memory effect are a tap coefficient of the FIR filter or the IIR filter.

6. A distortion compensation method performed by a distortion compensation device includes a memory and a processor coupled to the memory, the distortion compensation method comprising:
generating, from an output signal of a power amplifier that amplifies transmission signals having a plurality of different bands, a superimposed signal in which the transmission signals having the plurality of different bands have been superimposed by using the processor;
calculating, based on the superimposed signal, a first coefficient indicating a forward characteristic of nonlinear distortion of the power amplifier associated with each of the transmission signals having the different bands by using the processor;
converting the calculated first coefficient to a second coefficient indicating an inverse characteristic of the nonlinear distortion of the power amplifier by using the processor; and
performing, by using the converted second coefficients, a predistortion process on each of the transmission signals having the different bands by using the processor, wherein
the calculating the first coefficient includes calculating the first coefficient indicating the forward characteristic of the nonlinear distortion of the power amplifier for each magnitude of the transmission signal associated with each of the transmission signals having the different bands,
the converting the first coefficient includes calculating a reciprocal of the first coefficient as the second coefficient indicating the inverse characteristic of the nonlinear distortion of the power amplifier, and
the performing the predistortion process includes multiplying the second coefficient by the associated transmission signal.

* * * * *